United States Patent
Pedersen, Jr. et al.

(10) Patent No.: US 12,521,663 B2
(45) Date of Patent: Jan. 13, 2026

(54) FIBER BED FILTER AND MIST ELIMINATOR SYSTEM WITH ENHANCED DRAINAGE

(71) Applicant: Kimre, Inc., Homestead, FL (US)

(72) Inventors: George C. Pedersen, Jr., Coral Gables, FL (US); Miles Valentine, Merritt Island, FL (US); George C. Pedersen, Cutler Bay, FL (US)

(73) Assignee: Kimre, Inc., Homestead, FL (US)

( * ) Notice: Subject to any disclaimer, the term of this patent is extended or adjusted under 35 U.S.C. 154(b) by 0 days.

(21) Appl. No.: 19/192,746

(22) Filed: Apr. 29, 2025

(65) Prior Publication Data

US 2025/0332534 A1    Oct. 30, 2025

Related U.S. Application Data

(60) Provisional application No. 63/731,392, filed on Apr. 29, 2024.

(51) Int. Cl.
| | |
|---|---|
| *B01D 46/00* | (2022.01) |
| *B01D 1/30* | (2006.01) |
| *B01D 39/08* | (2006.01) |
| *B01D 53/26* | (2006.01) |
| *D03D 13/00* | (2006.01) |
| *B01D 46/24* | (2006.01) |
| *B01D 46/64* | (2022.01) |

(52) U.S. Cl.
CPC ......... *B01D 46/0031* (2013.01); *B01D 1/305* (2013.01); *B01D 39/08* (2013.01); *B01D 53/266* (2013.01); *B01D 46/24* (2013.01); *B01D 46/2407* (2013.01); *B01D 46/64* (2022.01); *B01D 2257/10* (2013.01); *B01D 2275/105* (2013.01); *D03D 13/004* (2013.01)

(58) Field of Classification Search
None
See application file for complete search history.

(56) References Cited

U.S. PATENT DOCUMENTS

| | | | | |
|---|---|---|---|---|
| 4,022,596 A | * | 5/1977 | Pedersen | B01D 45/08 428/116 |
| 4,086,070 A | | 4/1978 | Argo et al. | |
| 4,929,398 A | * | 5/1990 | Pedersen | B01J 19/32 55/489 |

(Continued)

FOREIGN PATENT DOCUMENTS

AU     2007248358 B2    11/2007

*Primary Examiner* — Gabriel E Gitman
(74) *Attorney, Agent, or Firm* — Farber LLC; Fritz L. Schweitzer, III

(57) ABSTRACT

A fiber bed assembly and mist eliminator system operable to collect a liquid phase from a gas stream has a fiber bed with first and second collection layers of dense collection media having randomly positioned fibers. An intermediate drainage layer disposed between and abutting the first and second collection layers has drainage media composed of a highly ordered geometric mesh structure having a high void fraction. The drainage layer forms a lateral drainage channel immediately downstream of the first collection layer and generally perpendicular to the gas flow direction, and the drainage layer is operable to drain the liquid phase collected by the first collection layer, in a lateral flow direction through the drainage layer.

32 Claims, 15 Drawing Sheets

(56) References Cited

U.S. PATENT DOCUMENTS

| | | | |
|---|---|---|---|
| 5,605,748 A * | 2/1997 | Kennedy | B01D 39/1623 |
| | | | 55/497 |
| 7,416,576 B2 | 8/2008 | Ziebold et al. | |
| 8,632,616 B2 | 1/2014 | Azwell et al. | |
| 2006/0150594 A1* | 7/2006 | Ziebold | B01D 46/64 |
| | | | 55/486 |
| 2011/0056381 A1 | 3/2011 | Azwell et al. | |
| 2016/0136554 A1* | 5/2016 | Swaminathan | B01D 39/1623 |
| | | | 55/486 |
| 2020/0155991 A1* | 5/2020 | Goris | B01D 46/0031 |
| 2024/0299870 A1* | 9/2024 | Harris | B01D 39/163 |

\* cited by examiner

FIBER BED FILTER AND MIST ELIMINATOR SYSTEM WITH ENHANCED DRAINAGE

FIELD OF THE INVENTION

The invention pertains to the field of fiber bed assemblies and mist elimination systems.

BACKGROUND OF THE INVENTION

Fiber bed mist eliminators have found wide application in the removal of suspensions of liquid and soluble and insoluble solid particles from gas streams emitted from a variety of industrial processes.

A mist eliminator is designed to treat gas streams that often contain multiple material phases. The primary phase is the continuous gas phase, which serves as the transport medium. Superimposed within this gas stream are one or more dispersed phases, which typically include a liquid phase which can include fine liquid droplets suspended in the gas. These droplets may range in size from submicron to several microns and may consist of water, acids, solvents, or process liquids.

The gas stream can also include a solid phase such as insoluble or soluble solid particles entrained in the gas stream, either as discrete particles or as part of composite aerosols (i.e., solids adhered to or dissolved in droplets).

Mist eliminators can target these dispersed phases—collectively referred to as entrained material—removing some or all of them from the carrier gas through mechanisms such as inertial impaction, interception, and Brownian diffusion.

Structurally, a typical fiber bed filter comprises one or more cylindrical filter elements (often referred to as "candle filters") mounted inside a vessel. The most common configuration is a vertically oriented cylindrical element. Each filter element typically includes a structural inner cage, a fiber bed media layer, and an outer cage, joined at the ends by plates to ensure structural integrity and sealing.

The core functional component of the filter element is the fiber bed media (also known as a fiberbed), which is responsible for capturing and coalescing entrained material. As examples, the fiber bed media may include a densely packed mat of fine fibers, or a tightly adhered spiral wound rope called roving comprised of spun fine to coarse fibers. Such media include randomly arranged fibers which form a tortuous, three-dimensional path through which the gas stream must pass. The configuration of the media maximizes the probability of particle capture via inertial impaction, interception, and Brownian diffusion—the latter being especially effective for submicron particles.

Roving refers to a long, narrow bundle of usually continuous fibers that are grouped together usually without significant twist. Roving is typically wound or wrapped around the inner support cage (or a previous wound layer) of the fiber bed assembly. As a result, in the formed collection layer, the fibers lie generally transverse to the direction of gas flow, but with substantial randomness which creates a tortuous path that enhances capture efficiency through interception, impaction, and diffusion mechanisms.

Fiber bed filters can be classified by the direction of gas flow through the media as forward flow or reverse flow, and as "outside-in" or "inside-out". In outside-in configurations, the process gas flows from the external surface inward toward the central core. In inside-out configurations, the gas flow is in the opposite direction—from the central core to the external surface.

A critical factor in the operational efficiency and long-term effectiveness of fiber bed mist eliminators is the proper drainage of coalesced liquid. As droplets accumulate on the fiber surfaces and coalesce into larger drops, they must be effectively drained—typically by gravity—toward the bottom of the filter element and away from the fiber bed. Inadequate drainage leads to liquid buildup within the media causing saturation (e.g., flooding) that reduces separation efficiency and increases the risk of droplet re-entrainment into the gas stream. This not only compromises the primary function of the filter but also poses risks to downstream equipment and emissions compliance. Moreover, saturation increases pressure drop across the fiber bed, thereby raising energy consumption for the system's blower or fan. Over time, this elevates operating costs and can result in fouling, shortened filter life, and the need for more frequent maintenance.

Despite the widespread use of fiber bed mist eliminators, many prior art designs do not adequately address these drainage limitations—particularly under conditions of high liquid phase loading. These shortcomings highlight the need for improved structural and functional fiber bed designs that enhance drainage performance, reduce pressure drop, and sustain collection efficiency across a range of industrial environments.

SUMMARY OF THE INVENTION

The present invention relates to a fiber bed assembly and mist eliminator system configured for the separation of entrained material from a gas stream. The fiber bed assembly is particularly suited for applications involving high liquid loading, where effective liquid management is critical to sustaining collection efficiency and minimizing operational pressure drop.

The fiber bed assembly has enhanced drainage within the fiber bed media which substantially improves drainage of the collected liquid phase thereby reducing pressure drop across the fiber bed, while increasing the life cycle of the component and maintaining high collection efficiency.

The enhanced drainage also improves the process of cleaning fiber bed assemblies, which can involve spraying the fiber bed assembly with a cleaning solution, and the cleaning solution penetrating into the fiber bed media, requiring drainage.

In certain embodiments, a fiber bed assembly is configured for a fiber bed mist eliminator operable to remove entrained liquid phase material from a moving gas stream. The fiber bed assembly includes a fiber bed supported by a fiber bed support, where the fiber bed has an upstream surface and a downstream surface and is operable to receive the moving gas stream having a gas flow direction transverse to the fiber bed, from the upstream surface to the downstream surface. The fiber bed comprises first and second collection layers, and an intermediate drainage layer disposed between the first and second collection layers. Each of the first and second collection layers comprises a dense collection media having randomly positioned fibers forming a tortuous gas flow path and being operable to capture entrained liquid phase material, as first and second collected material, respectively, by one or more methods of impaction, interception, and Brownian diffusion. The drainage layer abuts a downstream surface of the first collection layer and an upstream surface of the second collection layer. The drainage layer comprises a drainage media composed of a highly ordered geometric mesh structure having a high void fraction. The drainage layer forms a lateral drainage channel immediately downstream of the first collection layer and generally perpendicular to the gas flow direction, and the drainage layer is operable to drain the first collected material collected by the first collection layer, in a lateral flow direction through the drainage layer.

In certain embodiments the drainage media has low flow resistance in lateral and transverse directions relative to the collection media, and the drainage media has substantial compression resistance sufficient to withstand distributed compression forces encountered during use, without substantial deformation.

In certain embodiments the drainage layer is biased toward the upstream surface of the fiber bed.

In certain embodiments the first collection layer is disposed along the upstream surface of the fiber bed and/or the second collection layer is disposed along the downstream surface of the fiber bed.

In certain embodiments the first collection layer, second collection layer and/or the drainage layer extend substantially continuously from a top of the fiber bed to a bottom.

In certain embodiments the first collection layer has a thickness less than about 25% of the thickness of the fiber bed and the drainage layer has a thickness less than the thickness of the first collection layer, and in certain embodiments the thickness of the first collection layer is less than about 20% of the thickness of the fiber bed, and the thickness of the drainage layer is less than about 5% of the thickness of the fiber bed.

In certain embodiments the fiber bed support and fiber bed are generally cylindrical in shape, and the fiber bed has a generally cylindrical inner surface and a generally cylindrical outer surface, and the fiber bed assembly has a generally cylindrical void interior space defined by interior surface of the fiber bed;

In certain embodiments the drainage layer is substantially tubular in shape, the fiber bed assembly is configured for inside-out flow, the upstream surface of the fiber bed is disposed on the interior surface of the fiber bed and the downstream surface of the fiber bed is disposed on the exterior surface of the fiber bed, and the drainage layer is biased toward the interior surface of the fiber bed.

In certain embodiments the fiber bed support and fiber bed are generally cylindrical in shape, the fiber bed has a generally cylindrical inner surface and a generally cylindrical outer surface, and the fiber bed assembly has a generally cylindrical void interior space defined by the fiber bed, the drainage layer is substantially tubular in shape, the fiber bed assembly is configured for outside-in flow, the upstream surface of the fiber bed is disposed on the exterior surface of the fiber bed and the downstream surface of the fiber bed is disposed on the interior surface of the fiber bed, and the drainage layer being biased toward the exterior surface of the fiber bed.

In certain embodiments the geometric mesh structure of the drainage media comprises fabric-like material of a waffle-weave construction comprising repeating groups of first and second sets of strands, where the first set of stands comprises generally parallel strands which, in a planar configuration of the fabric-like material, extend in substantially straight fashion in one predetermined direction, each repeating group of strands of said first set being arranged in a generally saw-tooth cross sectional configuration whereby a thickness of said fabric-like material is substantially equal to a height of said saw-tooth cross sectional configuration, each repeating group of strands of said second set being arranged in a generally saw-tooth cross sectional configuration intersecting at right angles with the strands of said first set.

In certain embodiments the drainage media comprises a plurality of individual layers of the fabric-like material arranged in an abutting face-to-face relationship, and in each of the plurality of layers of the fabric-like material, intersecting strands of saw-tooth configuration form a substantially non-nestable waffle-weave construction, whereby the plurality of individual layers of the fabric-like material may be assembled in face-to-face contact without significant reduction in a void fraction in relation to the individual layers.

In certain embodiments the drainage layer consists of two sub-layers of the fabric-like media.

In certain embodiments the geometric mesh structure of the drainage media comprises fabric-like material having a first set of generally parallel strands extending in substantially straight fashion in one predetermined direction and a second set of strands extending at right angles to the predetermined direction, the strands of said first set being arranged in a repeating two-dimensional cross sectional geometric pattern in which strands at the extremes of the pattern define a fabric thickness which is a multiple of at least about 10 of a diameter of a strand, the strands of the second set also being arranged in a repeating two-dimensional cross sectional geometric pattern intersecting with the strands of the first set, the strands of the second set, at the extremes of the geometric pattern thereof, additionally defining a fabric thickness which is a multiple of at least about 10 of a diameter of a strand, the strands of the second set extending in substantially straight manner in regions between contact with strands of the first set, and the intersecting strands of the first and second sets forming a substantially non-nestable construction.

In certain embodiments, the geometric mesh structure of the drainage media comprises a first set of strands of material, each strand of the first set being substantially straight and parallel to every other strand in the set, where each strand of the first set being spaced from every other strand in the set both vertically and horizontally, a second set of strands of material interleaved with the first set, each of the strands of the second set being substantially parallel to every other strand in the set, the strands of the first set being perpendicular to the strands of the second set, the lengths of each strand of the second set extending in interleaved fashion through the strands of the first set in a geometric orientation to fit vertical and horizontal offset spacing of each strand in the first set, each of the strands of the second set including a plurality of substantially straight-line portions connected at angles to provide the geometric orientation, and the geometric orientation of the second set and the offset spacing of the first set giving the geometric mesh structure a thickness in cross section substantially greater than a diameter of the strands of the first and second sets of strands.

In certain embodiments the fiber bed is generally tubular.

In certain embodiments a shape of fiber bed is generally one of planar or undulating in shape, and the drainage layer is biased toward the upstream surface of the fiber bed.

In certain embodiments a mist eliminator system operable to remove an entrained liquid phase material from a moving gas stream includes a vessel operable to receive a gas stream having an entrained liquid phase through an inlet and operable to output processed gas through an outlet, and a fiber bed assembly as described above is disposed within the vessel and operable to collect the liquid phase of the gas stream, and the mist eliminator system has a high collection efficiency of the liquid phase, which in certain embodiments is at least about 94%.

The present invention addresses the challenges of liquid accumulation and poor drainage that can lead to flooding, increased pressure drop, and reduced filter performance. By improving the structural design of the fiber bed assembly and optimizing the flow paths for liquid removal, the invention sustains high collection efficiency and low pressure drop over extended operating periods. The invention also improves the ability to clean the fiber bed. Additional features and advantages of the invention will become apparent from the detailed description and figures that follow.

DETAILED DESCRIPTION OF THE PREFERRED EMBODIMENTS

Figure 1:
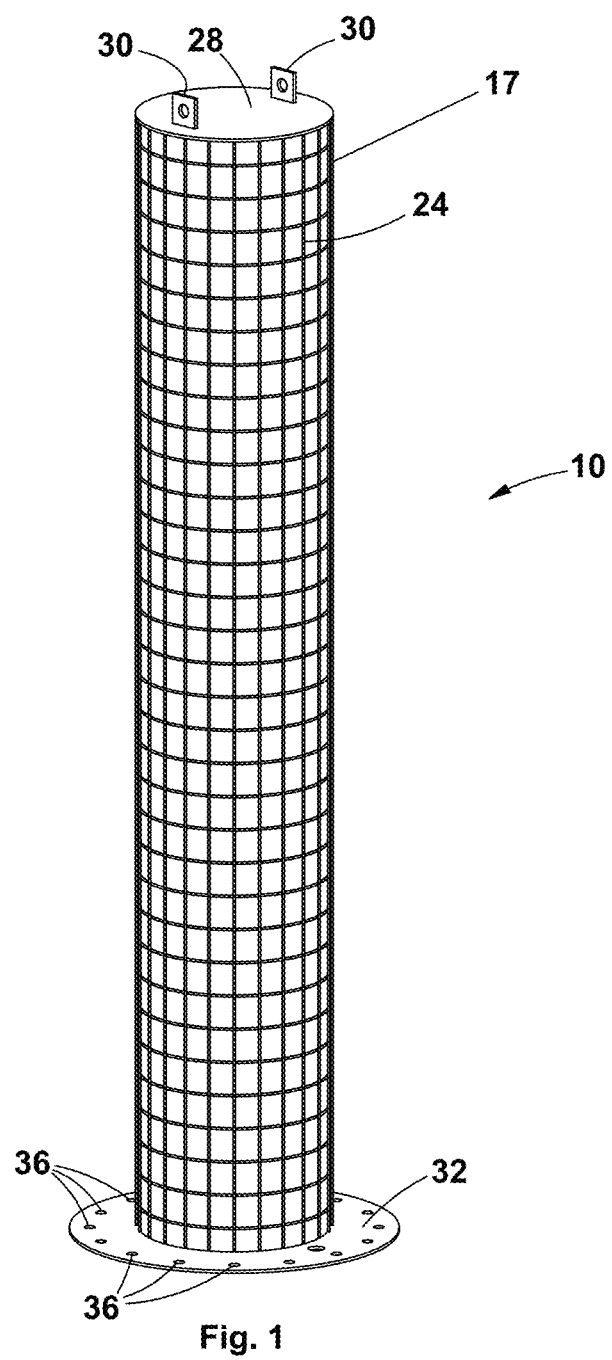
FIG. 1 is a perspective view of a first embodiment of a fiber bed assembly constructed in accordance with the invention.
Figure 2:
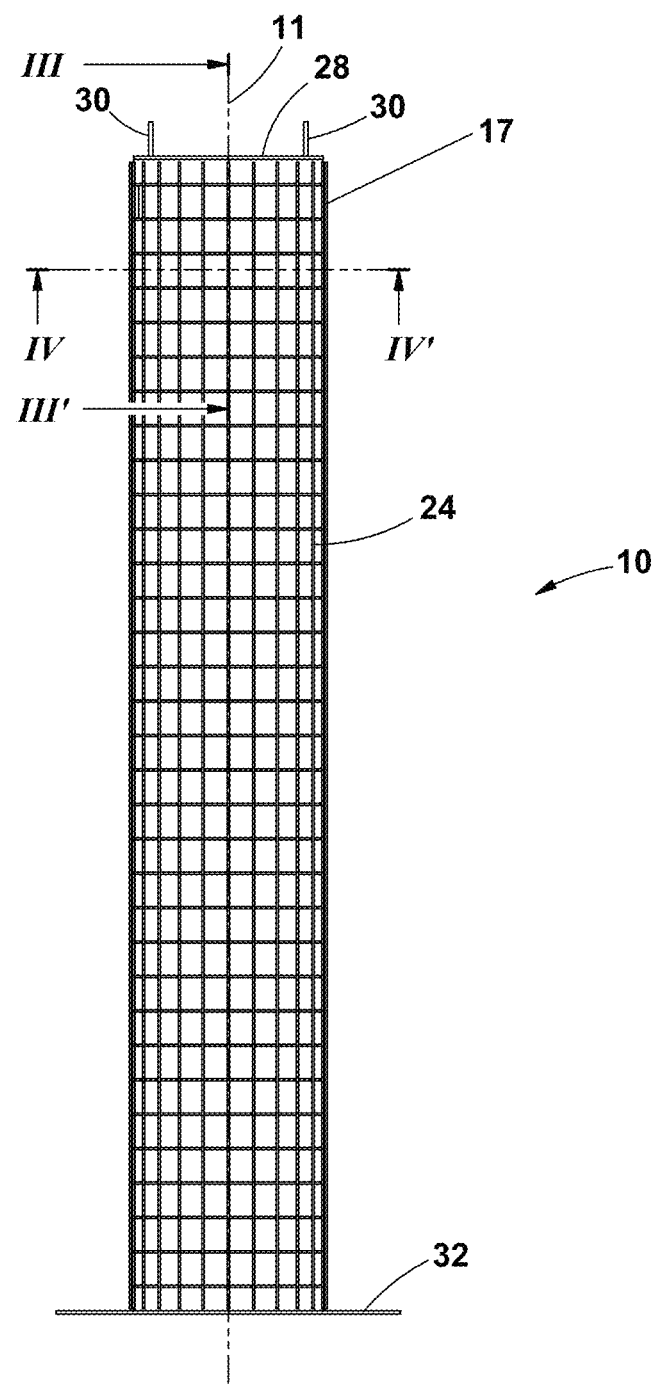
FIG. 2 is a side elevation view of the fiber bed assembly of FIG. 1.
Figure 3:
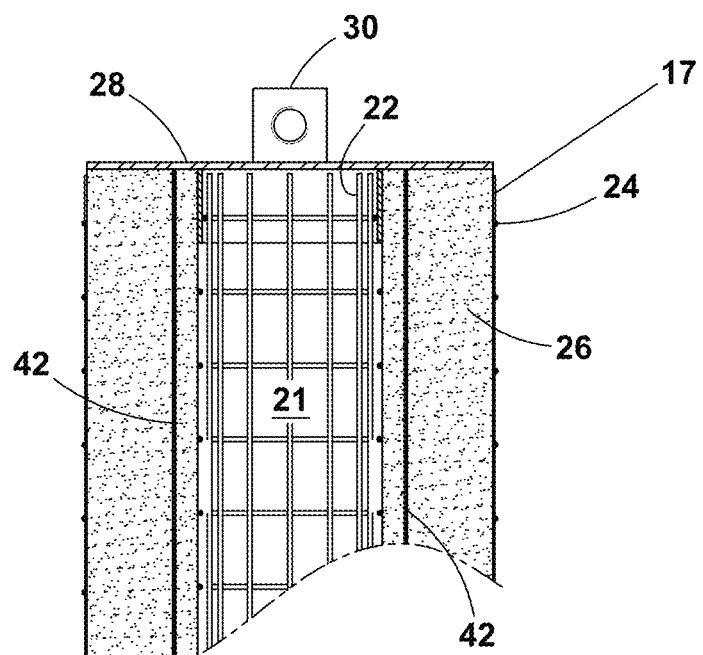
FIG. 3 is a partial cross-section view of the fiber bed assembly if FIG. 1, taken along line III-III' of FIG. 2.
Figure 4:
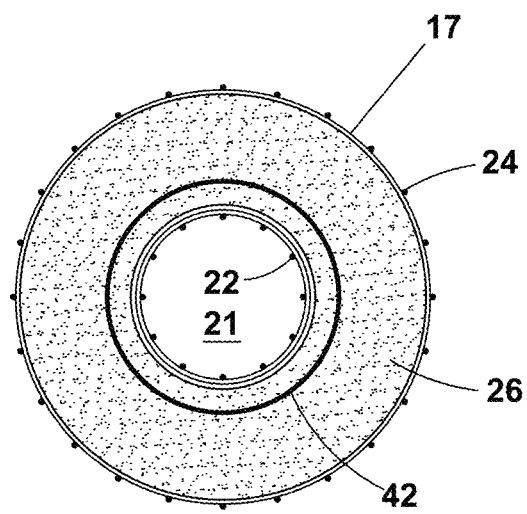
FIG. 4 is a cross-section view of the fiber bed assembly if FIG. 1, taken along line IV-IV' of FIG. 2.

Referring to FIGS. 1 through 7, a first embodiment of a fiber bed assembly 10 constructed in accordance with the invention has a unique construction including an intermediate drainage layer having certain characteristics which result in a substantial improvement in the performance of the fiber bed assembly including reducing pressure drop and operating costs and increasing life cycle, while achieving a high collection efficiency, for example at least about 94% and preferably up to 99.5% and higher, depending on the application. The removal of the coalesced liquid by the intermediate drainage layer leads to lower velocities in the subsequent downstream layer(s) of the fiber bed media which can also translate to lower pressure drops and lower fan amperages.

The fiber bed assembly 10 is configured to be removably mounted within a mist eliminator vessel 12, which can be configured for vertical orientation and inside-out process gas flow through the fiber bed assembly.

The mist eliminator vessel 12 preferably includes a bottom portion 13 with an inlet pipe 14 and a lower collection chamber 18 with a drain pipe 20. The vessel 12 also preferably includes a top portion 15 with an outlet pipe 16.

The fiber bed assembly 10 can be generally cylindrical in shape having a central longitudinal axis 11 (although other shapes are possible) and has a fiber bed support 17 which can include a structural inner cage 22 and an outer cage 24. These cages support a fiber bed media 26 disposed therebetween. The inner and outer cages 22, 24 can be any suitable support, such as wire mesh cross-ribs or skeletal frames, although other mechanical supports such as spiral wraps or axial reinforcements may be employed, particularly in high-load or high-vibration environments. The cages may be fabricated from carbon steel, stainless steel alloys, Titanium, Alloy 20, superalloys, duplex alloys, fiber-reinforced plastic (FRP), engineered polymer materials or other suitable materials, selected based on the chemical and thermal conditions of the process environment. The cages can also be constructed using expanded or perforated metal, wire mesh, or similar open frameworks to allow free gas flow while structurally supporting the fiber media, or other suitable constructions. These cages support and maintain the shape and integrity of the fiber bed media 26 during installation and operation, while also facilitating uniform media distribution and predictable flow behavior.

At the top of the fiber bed assembly 10 is a top plate 28 that preferably spans the outer circumference of the outer cage 24. The top plate 28 can be equipped with lifting lugs 30 for safe installation and removal of the fiber bed assembly 10. The bottom of the fiber bed assembly 10 terminates in a bottom flange 32 which is preferably annular in shape. The bottom flange 32 includes a central through-hole 34, through which process gas enters the fiber bed assembly 10. The flange 32 can also include a plurality of circumferentially spaced through-holes 36 for receiving mounting fasteners, enabling secure installation of the fiber bed assembly 10 within the vessel 12. However, the fiber bed assembly 10 may be mounted to the vessel 12 using any appropriate method, including bolted connections with gaskets, quick-clamp ring systems, or gasketed groove-and-seating configurations, or other appropriate connections to ensure seal integrity and ease of maintenance.

Figure 5:
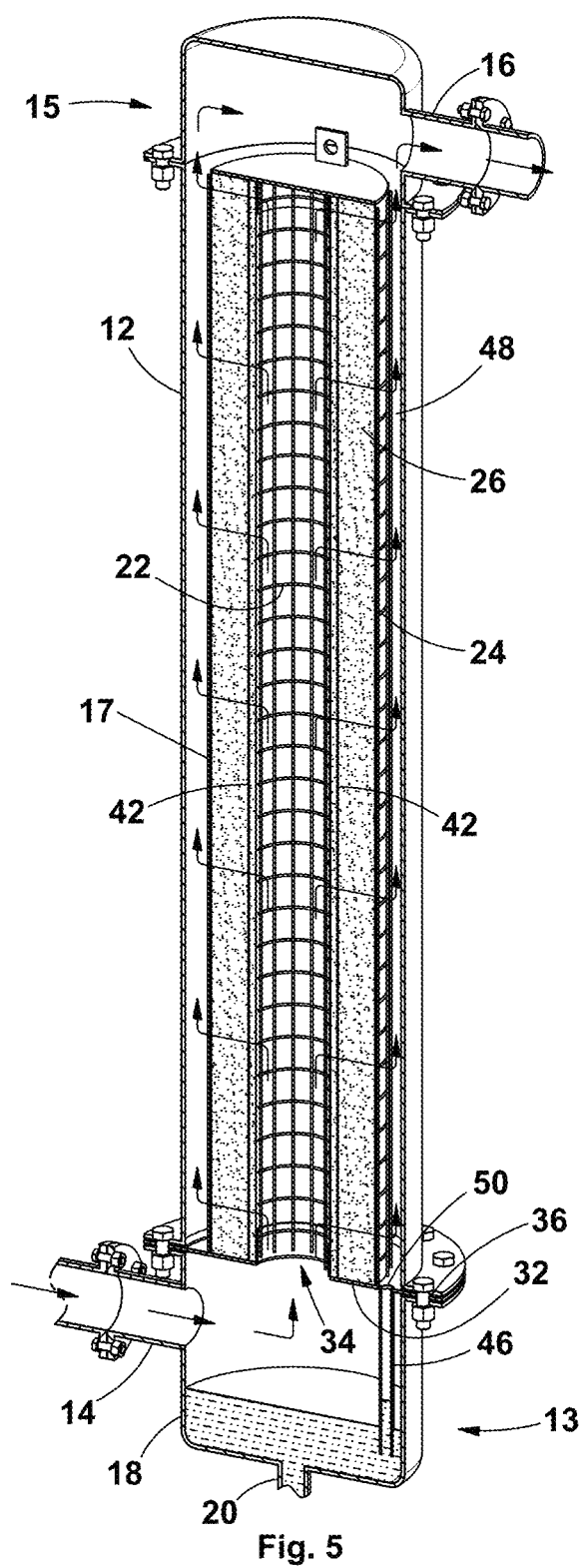
FIG. 5 is a perspective cross-section view of the fiber bed assembly of FIG. 1 installed in a fiber bed mist eliminator.
Figure 6:
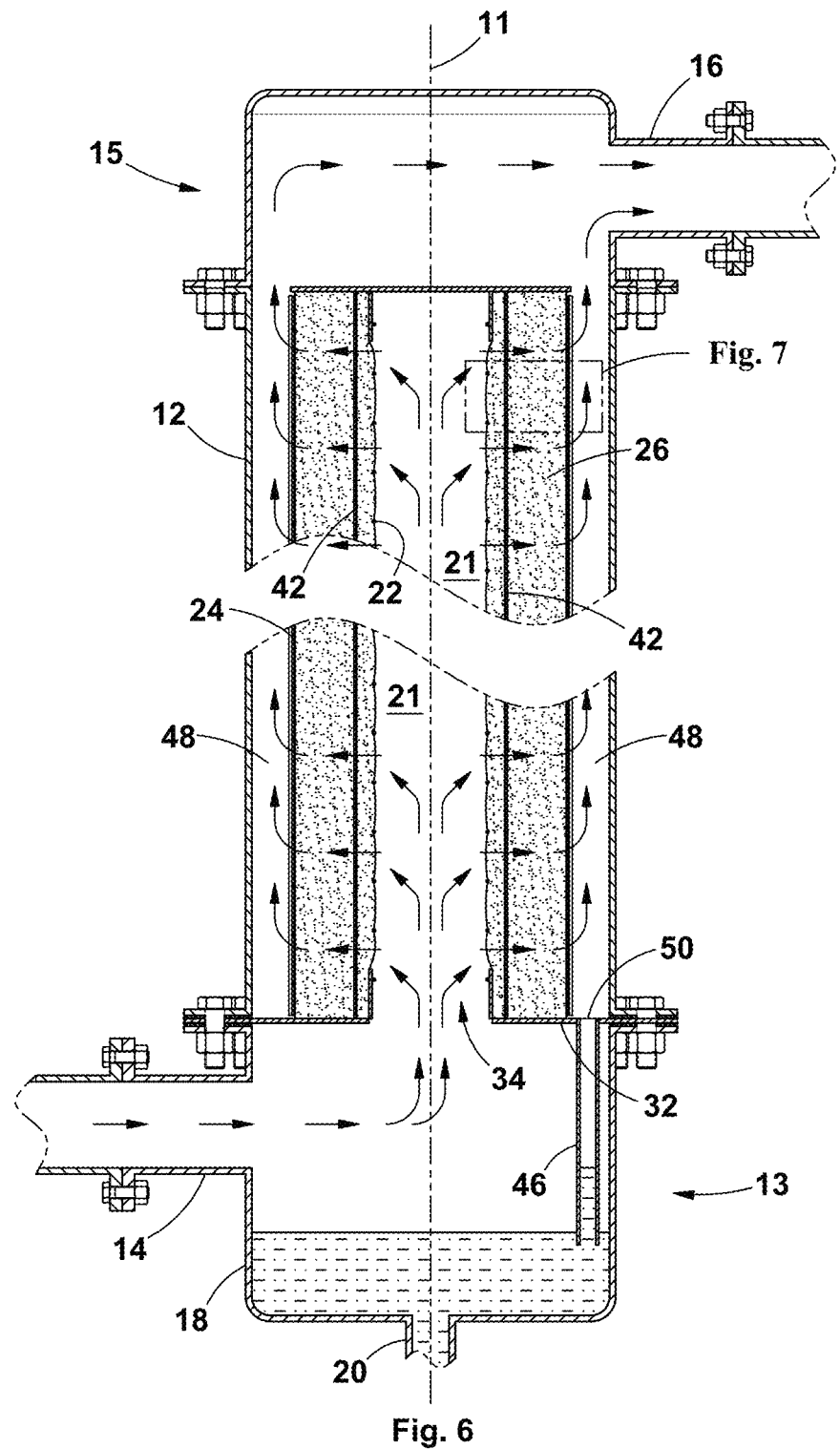
FIG. 6 is an elevation cross-section view of the fiber bed assembly of FIG. 1 installed in a fiber bed mist eliminator, showing the cutting plane.

Referring to FIGS. 5 and 6, the fiber bed assembly 10 is operable to clean the process gas by capturing and removing entrained materials in the gas stream as the gas passes therethrough and before the gas is released or sent to downstream equipment. Such entrained materials can include micron and sub-micron droplets and aerosols (e.g., a gaseous suspension of liquid and/or solid particles, including mists, fogs, fumes, smokes, or dusts, that may be soluble or insoluble in the liquid) and other entrained materials. The entrained material captured by fiber bed assembly 10 can be referred to as captured material.

In this embodiment, the fiber bed assembly 10 can be configured as a "standing candle" operable for inside-out gas flow. The fiber bed media 26 has a generally cylindrical inner surface and a generally cylindrical outer surface.

During operation, process gas enters the interior of the vessel 12 through the inlet pipe 14, passes through the central through-hole 34 of the bottom flange 32 of the fiber bed assembly 10, enters a (typically cylindrical) interior 21 (i.e., void) of the fiber bed assembly 10 defined by the inner cage 22, flows upward through the interior 21, and then flows radially outward through the fiber bed media 26 and into a downstream area 48 of the vessel 12 which is disposed radially outward from the fiber bed assembly 10. Thus, in this example the direction of gas flow through the fiber bed media 26 is generally horizontally radially outwardly, from the interior 21 of the fiber bed assembly 10 to the downstream area 48.

After passing through the fiber bed media 26, cleaned gas travels upward and exits the vessel 12 through the outlet pipe 16 at the top.

Entrained materials captured by the fiber bed 26 (i.e., captured material) coalesces and drains downward through the fiber bed 26 and into the collection chamber 18, where it exits through the drain pipe 20. The fiber bed assembly 10 (and/or the vessel 12) can include a drain tube 46 projecting from the annular bottom flange 32 into the lower collection chamber 18. The drain tube 46 is preferably in fluid communication the downstream area 48 of the vessel, for example via a fluid passage 50 in the annual bottom flange 32.

Figure 7:
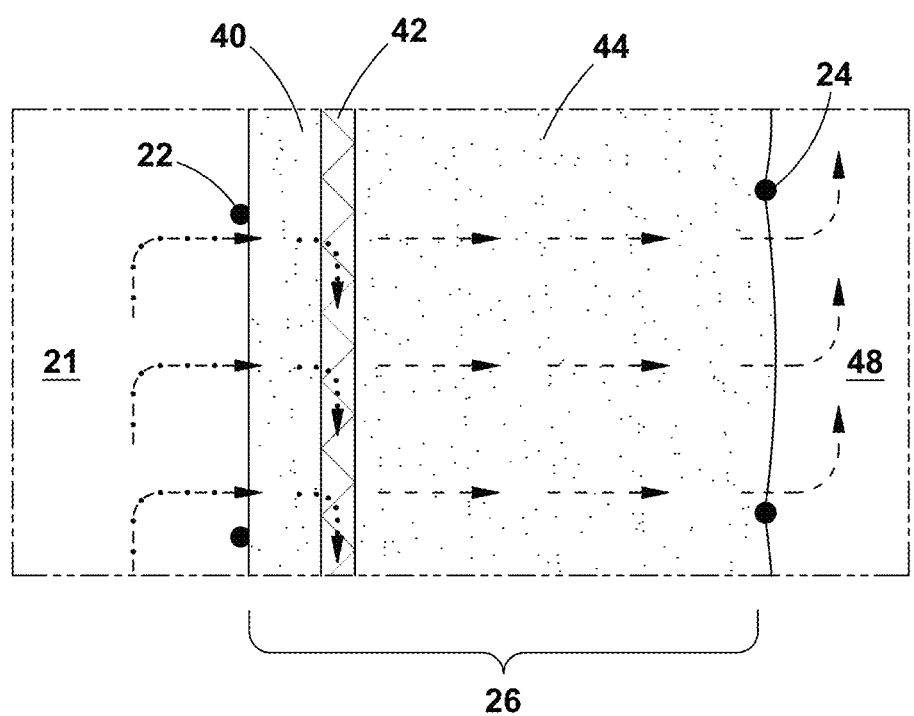
FIG. 7 is a close-up view of the fiber bed assembly of FIG. 1, labeled FIG. 7 in FIG. 6.
Figure 8:
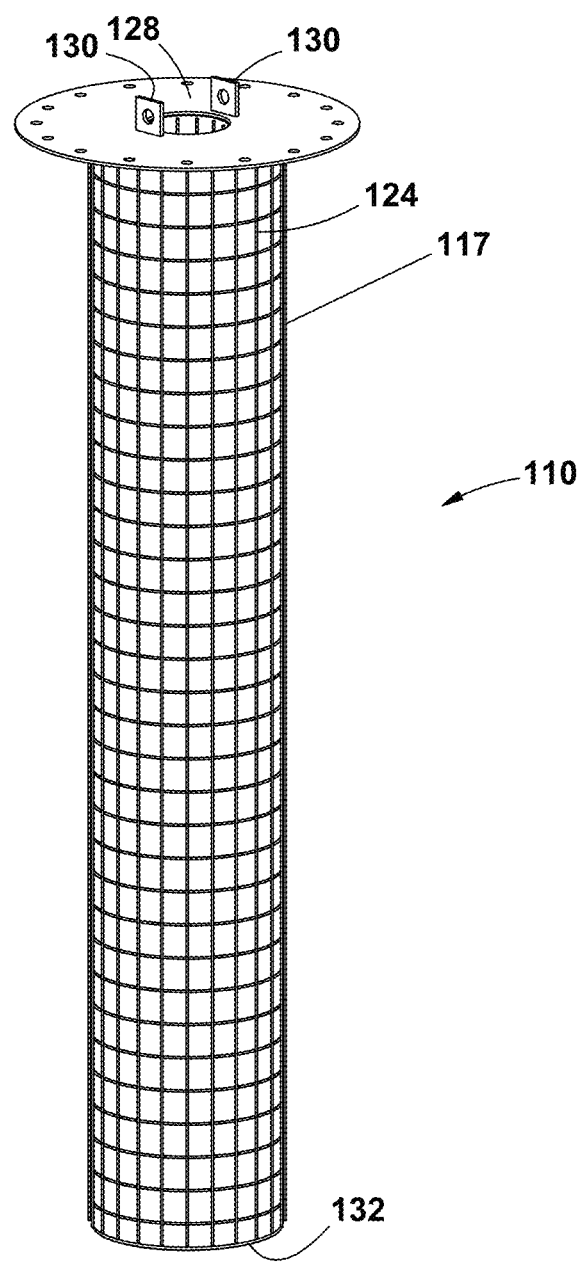
FIG. 8 is a perspective view of a second embodiment of a fiber bed assembly constructed in accordance with the invention.
Figure 9:
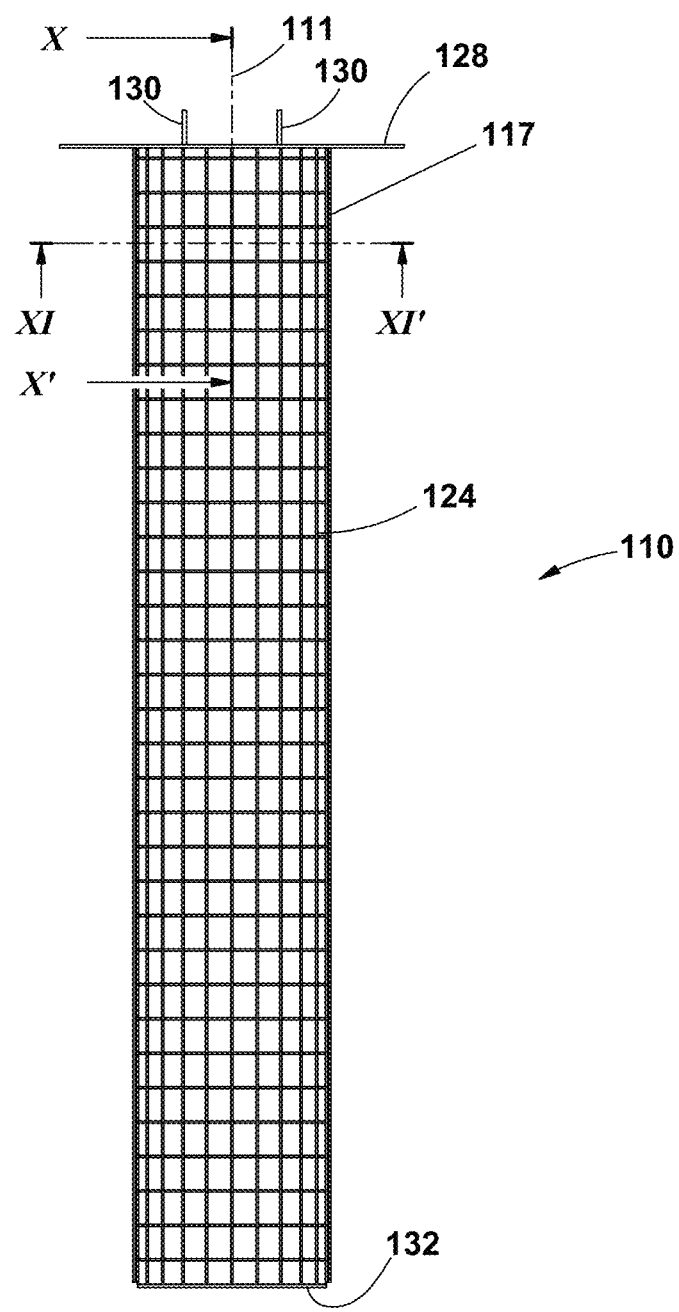
FIG. 9 is a side elevation view of the fiber bed assembly of FIG. 8.
Figure 10:
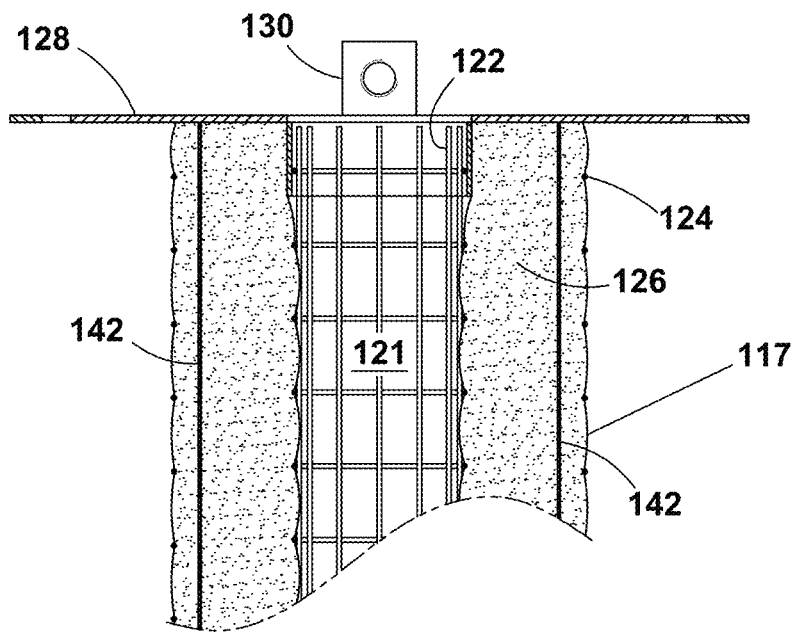
FIG. 10 is a partial cross-section view of the fiber bed assembly if FIG. 8, taken along line X-X' of FIG. 9.
Figure 11:
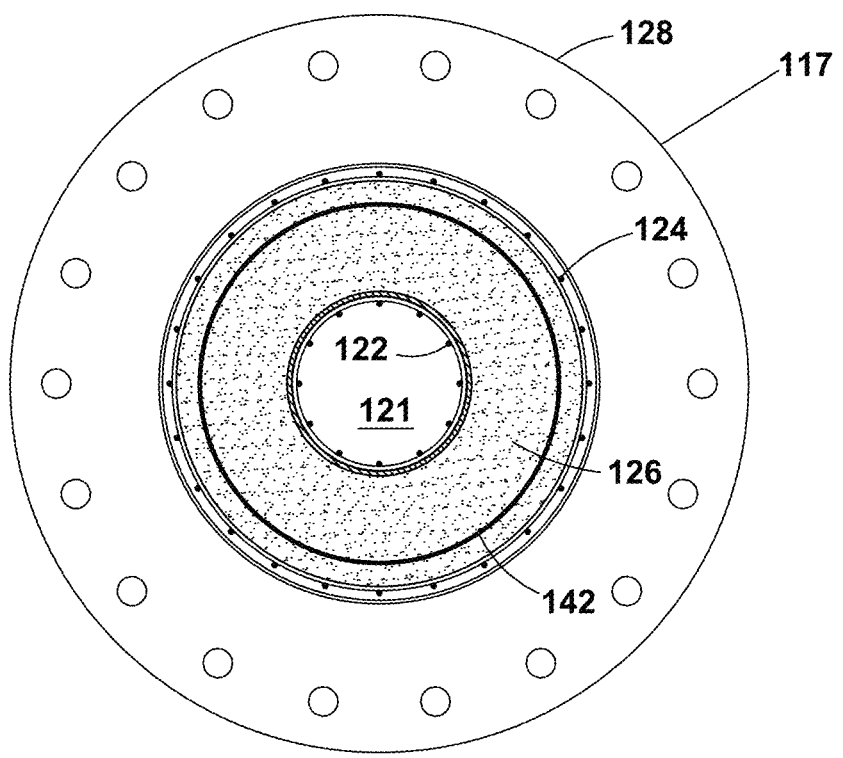
FIG. 11 is a cross-section view of the fiber bed assembly if FIG. 8, taken along line XI-XI' of FIG. 9.

As best seen in the detailed cross-sectional view of FIG. 7, the fiber bed media 26 preferably comprises a set of three layers including first and second collection layers 40, 44 and an intermediate drainage layer 42 disposed between the first and second collection layers. The set of three layers is disposed between the fiber bed support 17, for example spanning between the inner and outer cages 22, 24. The first and second collection layers 40, 44 and the intermediate drainage layer 42 can be substantially tubular in shape.

The first and second collection layers 40, 44 are preferably configured and optimized for collection of an entrained liquid phase in the gas stream (including but not limited to aerosols) and can be composed of the same type of fiber media, although different materials may be used depending on the application.

The first and second collection layers 40, 44 can be composed of various types of fibrous materials selected based on chemical compatibility, particle size distribution, and operating temperature. Each of the first and second collection layers 40, 44 can comprise one or more sub-layers of collection media, and the sub-layers can be the same or differing materials.

Common collection media types include E-glass, a ceramic glass fiber made from alumino-borosilicate glass (e.g., 2-10 microns in diameter, typical 6 to 9 microns), Polyethylene terephthalate (PET), commonly known as polyester (e.g., 8-20 microns, typical 10-15 microns), and polypropylene (e.g., typical 12-18 microns, range 10-25 microns).

The first and second collection layers 40, 44 can consist of or comprise mat fiber bed media and/or roving fiber bed media, or other suitable media. The fibers of such media are substantially randomly oriented and/or positioned within the media to create a dense, tortuous path that enhances impaction, interception, and Brownian diffusion mechanisms for capturing entrained materials, such as aerosol particles. Other options may include PTFE, chemical grade fiberglass (C-glass) which has a higher content of alkali oxides, or ceramic fibers for high-temperature or chemically aggressive applications. In some configurations, additional layering or fiber orientation may be used to optimize capture and drainage characteristics.

The packing density of the collection media is commonly expressed in pounds per cubic foot (lb/ft$^3$) or kilograms per cubic meter (kg/m$^3$). For example, borosilicate glass fiber beds typically have densities ranging from 2 to 6 lb/ft$^3$ (32-96 kg/m$^3$), with 3.5 lb/ft$^3$ (56 kg/m$^3$) being typical. Density is measured by dividing the total weight of the fiber media by the calculated media volume, considering the cylindrical dimensions and fiber bed thickness. Higher densities increase collection efficiency but also contribute to higher pressure drop and slower drainage, requiring a careful balance in design.

The first collection layer 40 can be considered an initial coalescing layer and can be configured and optimized for treating a gas stream having a relatively high liquid phase component. The second collection layer 44 can be considered a performance coalescing layer and can be configured and optimized for treating a gas stream having a relatively lower liquid component. For example, considering a high liquid loading application, the first collection layer 40 can consist of or comprise relatively coarse media (e.g., about 15-25 micron) and the second collection layer 44 can consists of or comprise relatively fine media (e.g., about 8 micron). Or the first collection layer 40 and the second collection layer 44 may have the same or similar media selections, for example in relatively low liquid load applications.

Either or both the first and second collection layers 40, 44 may be of one contiguous media type or may be comprised of multiple sub-layers of the same or different media types, some of which include fine media with high removal performance.

The first collection layer 40 is preferably disposed upstream of the drainage layer 42 in a flow direction of the process gas through the fiber media, i.e., radially inwardly of the drainage layer 42 in this embodiment. The drainage layer 42 preferably abuts and is positioned downstream of the first collection layer in the flow direction of the process gas through the fiber media. The second collection layer 44 preferably abuts and is positioned downstream of the drainage layer in the flow direction of the process gas through the fiber media.

The fiber bed media 26 has a generally cylindrical inner surface and a generally cylindrical outer surface. In this embodiment (configured for inside-out flow), the inner surface is upstream, and the outer surface is downstream.

The first collection layer 40 is preferably disposed on and/or substantially forming the inner (upstream) surface of the fiber bed media 26 and the second collection layer 44 is preferably disposed on and/or substantially forming the outer (downstream) surface. However, other configurations are within the scope of the invention. For example, the first collection layer 40 can be disposed on the inner (upstream) side of the fiber bed media 26 with the drainage layer 42 and the second collection layer 44 disposed in an interior of the fiber bed media 26, with an additional layer or layers of collection, drainage or other media (not shown) disposed on the outer (downstream) side of the fiber bed media 26. Or the second collection layer 44 can be disposed on the outer (downstream) side of the fiber bed media 26 with the first collection layer 40 and the drainage layer 42 disposed in an interior of the fiber bed media 26, with an additional layer or layers (not shown) disposed on the inner (upstream) side of the fiber bed media 26. Or the first and second collection layers 40, 44 and the drainage layer 42 can be disposed in an interior of the fiber bed media 26, with an additional layer or layers (not shown) disposed on the inner (upstream) and outer (downstream) sides of the fiber bed media 26. Preferably, in each of these configurations the first and second collection layers 40, 44 and the drainage layer 42 and are in an abutting relationship with the drainage layer 42 disposed between and abutting the first and second collection layers 40, 44.

The drainage layer 42 is preferably configured and optimized for drainage of the liquid phase captured (e.g., coalesced) by the first collection layer 40. The drainage layer 42 preferably consists of or comprises a substantially uniform, highly ordered and repeating geometric engineered textile or knitted geometric mesh structure material, such as a 3D structured thermoplastic matrix of woven yarns. It has been found by the inventors that the use of such material as an intermediate drainage layer provides a predominantly open path through which liquid can readily drain and is very effective at promoting drainage of collected material.

The material of the drainage layer 42 preferably has one or more of the following characteristics: high liquid and gas permeability, a substantial or high void fraction, low liquid flow resistance, hydrophobic properties, a low density, high chemical resistance and/or substantial compression resistance such that it forms a durable, resistant, and high flow capacity drainage channel within the interior of the fiber media 26 through which coalesced liquid may flow, for example downwardly under the force of gravity, for collection in the lower collection chamber 18. One suitable material for the drainage layer is polypropylene strands, although other materials are also suitable.

The drainage layer 42 can consist of one or more sub-layers of drainage material stacked (or layered) in an abutting or closely abutting relationship in the direction of the gas flow. For example, it has been found by the inventors that a drainage layer 42 having two relatively thin, abutting sub-layers of drainage material offers substantial performance benefits.

Where the drainage layer 42 includes multiple sub-layers, the material is preferably substantially non-nestable such that the void fraction of each sub-layer is not reduced by any substantial nesting of the sub-layers. Sub-layers of the drainage layer 42 can be the same or different material.

The fiber bed assembly 10 is preferably oriented vertically during use such that the drainage layer 42 is oriented vertically, which allows captured material (e.g., coalesced liquid) to flow downwardly along the height of the drainage layer 42, parallel to the surfaces thereof. Thus, drainage layer 42 is particularly suitable for lateral flow of collected material (also called in-plane or planar flow) parallel to the major surfaces of the drainage layer material (i.e., perpendicular to the direction of gas flow through the fiber bed media 26), as distinguished from through-plane flow (also called transverse flow or perpendicular flow).

The material of the drainage layer 42 preferably has a low liquid flow resistance including at least a low lateral flow resistance in the lateral flow direction, i.e., parallel to the surfaces of and along a height of the drainage layer 42. Preferably, the lateral liquid flow resistance of the drainage layer 42 is substantially less than a liquid flow resistance of the second collection layer 44 and/or the first collection layer 42 such that the drainage layer 42 forms a defined and locally relatively low-flow resistance vertical drainage channel upstream of the second collection layer 44 in the gas flow direction.

The drainage layer 42 also preferably has a low transverse flow resistance (i.e., through-plane) such that process gas, and particularly including the gas phase thereof and remaining entrained materials, may flow through the drainage layer 42 to the second collection layer 44.

The void fraction of the drainage layer 42 is preferably high, greater than or equal to about 92% but can be up to about 98% void fraction. Alternatively, the void fraction of the drainage layer 42 can be low, for example about 50% and higher. A measure of the open space in a fiber bed is void fraction which is defined by the bulk density of the fiber bed and the average density of the fiber material according to the following formula:

Fiber bed void fraction=1−[fiber bed bulk density/average fiber material density]

For certain applications requiring chemical resistivity (for example processing gas steams containing sulfuric acid), the drainage layer 42 can consist of or comprise a metal material such as a highly-ordered, knitted or crimped, metallic geometric mesh structure material formed of or including thin metal wire strands, such as stainless steel (e.g., SAE 316L grade stainless steel or Alloy 20), or other suitable material with high or substantial chemical resistivity.

The drainage layer 42 preferably also has substantial compression resistance, for example due to a structured geometry, such that it is operable to withstand substantial compressive forces, including distributed compressive forces, within the fiber bed media 26 under normal operating conditions, without substantial deformation and while maintaining an open, functioning drainage channel.

One factor in the compressive force within a fiber bed during operation is the total pressure drop within the media. Total pressure drop across a fiber bed media depends on factors such as fiber diameter, packing density, bed thickness, face velocity, liquid loading, and media saturation. However, for dry or clean operating conditions (i.e., before significant liquid loading or fouling), typical pressure drops range from: 0.25 to 6.0 (or more typically 1.5 to 4.0) inches of water column (in. w.c.). When the fiber bed becomes wet or saturated, pressure drop can increase significantly due to increased resistance from the collected liquid and possible channeling or flooding.

An additional factor in the compressive force within a fiber bed can be the presence of mechanical compression caused by the fiber bed support 17, for example compression of the fiber bed media 26 between the inner and outer cages 22, 24. Such mechanical compression can increase the compressive forces within the fiber bed media 26, including on the drainage channel 42. In some cases, this mechanical compression can be the primary compressive force on the fiber bed, including during operation.

It is desirable that the drainage layer 42 is operable to withstand the total compressive forces at its location under all operating conditions without substantial deformation such that the permeability and low flow resistance of the drainage layer remain substantially unchanged under such conditions, to maintain a functioning drainage channel.

Referring to the close-up view of FIG. 7 (which is not necessarily to scale), the drainage layer 42 is preferably biased toward the upstream surface of the fiber bed media 26. However, the drainage layer 42 can be disposed at different depths within the fiber bed media 26 to adjust for various applications and/or liquid loading in the gas flow.

Preferably, the first collection layer 40 is relatively thin and the second collection layer 44 is relatively thick such that the drainage layer 42 is disposed relatively close to the upstream surface of the fiber bed media 26 so that the drainage layer 42 is in an upstream-biased position and therefore is operable to drain captured material (e.g., coalesced liquid) out of the fiber bed media 26 at a relatively early point in the flow of process gas through the fiber bed media 26.

A critical factor in the operation of a fiber bed system is the total pressure drop within the media, with a goal being to minimize total pressure drop. It has been found by the inventors that providing the drainage layer 42 in an upstream-biased position has a significant positive impact on the efficiency of fiber bed media, decreasing the total pressure drop through the fiber bed media 26 by as much as 0.5 inches or more (e.g., more than 10% improvement). The drainage layer 42 has been found to substantially reduce the liquid loading in the second collection layer 44. With lower liquid loading in the second collection layer 44, the overall pressure drop is reduced.

The first and second collection layers 40, 44 and the drainage layer 42 can have thicknesses as measured along the flow direction of the process gas from the upstream surface to the downstream surface of the of the fiber bed media 26. The first collection layer 40 can have a thickness less than a thickness of the second collection layer 44, and the drainage layer 42 can have a thickness less than the thickness of the first collection layer 40. For example, as a percentage of the total thickness of the fiber bed media 26, the first collection layer 40, drainage layer 42 and second collection layer 44 can have thicknesses of about 5-50%, 0.5-20% and 30-94.5%, respectively, for example about 15%, 2% and 83%, respectively. As another example, the drainage layer can have a thickness of less than about 5%. However, other relative thicknesses are within the scope of the invention.

For example, the fiber bed media 26 can have an overall thickness, as measured along the flow direction of the process gas from the upstream surface to the downstream surface, of about 4-8 inches, and the drainage layer 42 can have a corresponding thickness of about 0.08-0.16 inches (e.g., about 2% total thickness).

It has been found by the inventors that the lateral drainage performance of the drainage layer 42 is high and therefore the drainage layer 42 can be relatively thin as described herein. This allows the second collection layer 44 to be relatively thick which improves performance of the fiber bed media 26. Since much of the process liquid is drained by the drainage layer 42 before reaching the second collection layer 44, and because the drainage layer 42 is relatively thin, the second collection layer 44 has more open area (e.g., non-flooded area) for gas flow as compared to prior designs. The increase in open area leads to slower forward velocities of the process gas hence lower pressure drops for a given liquid loading and gas flow. In addition, the lower forward velocity increases the potential for the entrained liquid phase to collide with fibers of the second collection layer 44 due to impaction and Brownian diffusion interaction, improving efficiency.

The first and second collection layers 40, 44 and the drainage layer 42 preferably extend substantially continuously along a height of the fiber bed assembly 10, from the top plate 28 to the bottom flange 32, and/or substantially continuously around the circumference of the fiber bed assembly 10, and the drainage layer 42 preferably abuts the first and second collection layers 40, 42 continuously along such height and/or circumference, such that the drainage layer 42 forms a substantially continuous (e.g., tubular) drainage channel along the height of the fiber bed assembly. However, other configurations are within the scope of the invention. For example, the drainage layer 42 can be non-continuous along the height and/or the circumference of the fiber bed assembly 10 and/or the drainage layer 42 can be comprised of individual panels disposed along the height and/or circumference of the fiber bed assembly 10 which may be in an abutting relationship or may have gaps therebetween. Such gaps, if present, are preferably substantial narrow such that a drainage channel is maintained between the first and second collection layers 40, 44 under operation such that the drainage channel remains open. Alternatively, the drainage layer 42 can include regularly or randomly located perforations (e.g., through holes) over some or all of the surface thereof.

To construct the fiber bed assembly 10, the fiber bed media 26 is preferably wrapped around the inner cage 22. The set of three layers of the fiber bed media 26 can be independent, or some or all layers can be bound or joined together to form a full or partial laminate. For example, if the layers are independent, they can be wrapped around the inner cage 22 in sequential steps, with the innermost layer of the set (e.g., the first collection layer 40) being the first of the three layers to be wrapped, followed by the intermediate layer (e.g., the drainage layer 42), and then the outermost layer of the set (e.g., the second collection layer 44). On the other hand, if some or all the three layers are joined prior to installation (e.g., laminated), the laminate can be wrapped around the inner cage 22 in one step. The layers of the set of three layers (or any laminated layers) are preferably wrapped around the inner cage 22 in a circular manner. However, such layers can optionally be wrapped in other manners, such as a spiral or helical wrap.

As discussed above, any of the set of three layers can be composed of multiple sub-layers, for example layered in the direction of the gas flow through the fiber bed media. In such a case, the sub-layers can be wrapped around the inner cage 22 sequentially to build the respective layer.

Likewise, if any layer or sub-layer s is composed of multiple sections (e.g., stacked vertically and/or angularly arranged circumferentially) such sections can be wrapped sequentially to build the layer or sub-layer.

The fiber bed media 26 can include several separate drainage layers similar to the drainage layer 42 as described herein, which can be separated radially (e.g., horizontally) and or longitudinally (e.g., vertically) by collection layers or other layers.

The drainage layer 42 also improves the process of cleaning fiber bed assemblies. A fiber bed assembly can be cleaned by spraying the outer surface with water or an appropriate cleaning solution to dislodge accumulated solids and flush away coalesced liquids that may have fouled or clogged the fiber bed media over time. The solution may penetrate the surface layers. Spray nozzle washing may be performed periodically in operation, or performed following a shut-down to remove soluble molecules that could precipitate out. Washing may be especially required at the start of a long shutdown to remove dissolved salts. After salts are flushed away the candle/element may dry with little risk of deposit formation. The drainage layer improves and enhances drainage of the cleaning solution from the fiber bed media.

Figure 16:
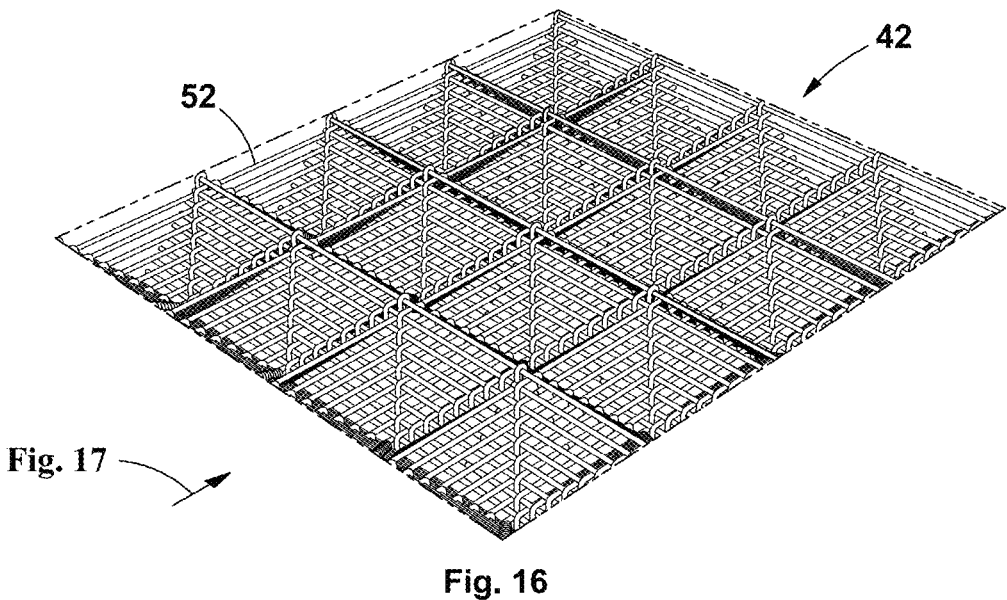
FIG. 16 is a perspective view of a first geometric textile material.
Figure 17:
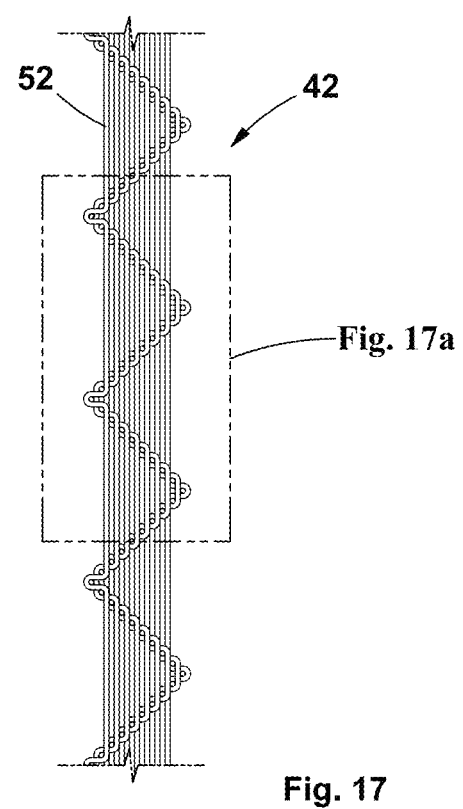
FIG. 17 is a cross-section view of the geometric textile material of FIG. 16.
Figure 17A:
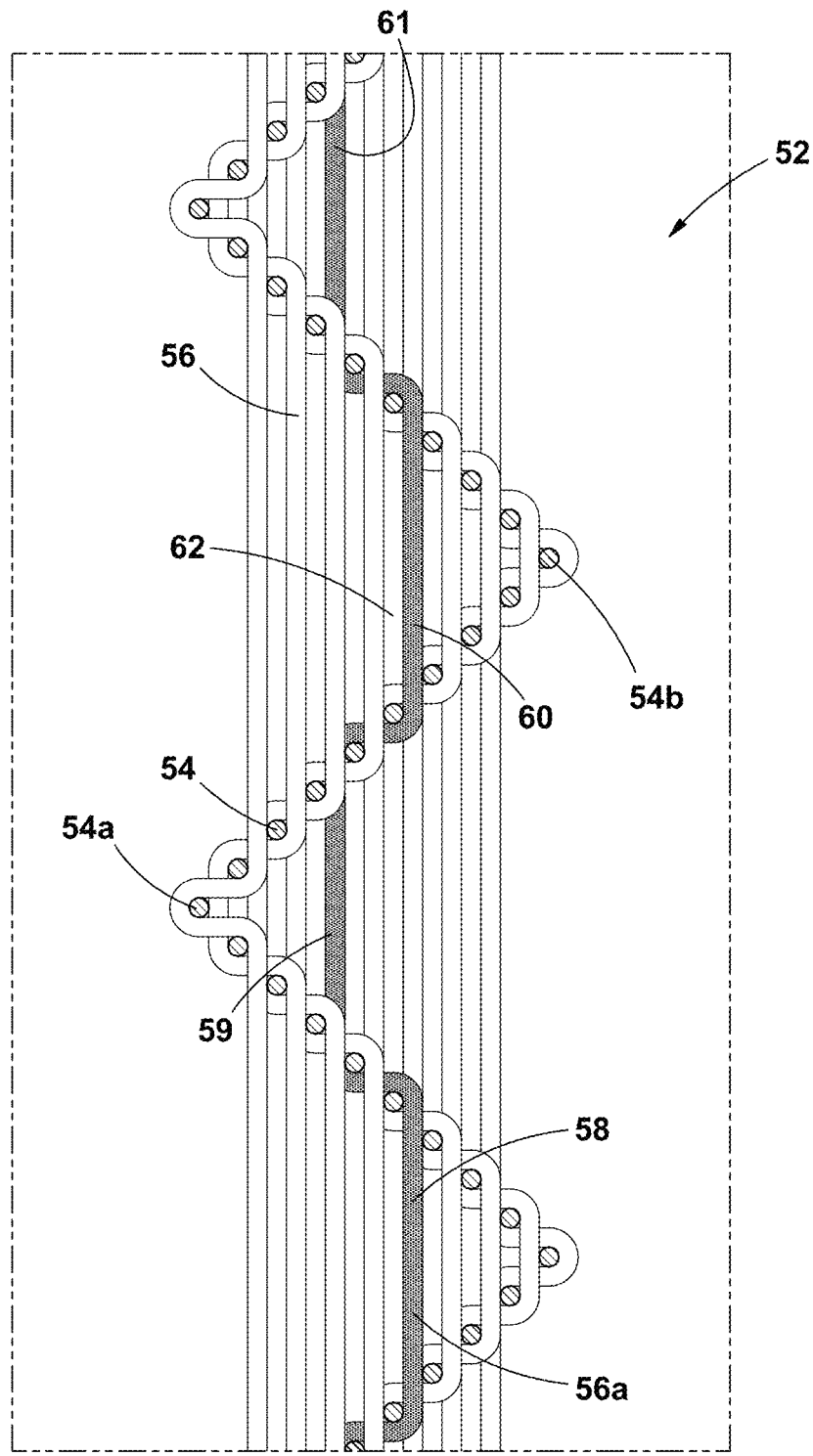
FIG. 17A is a close-up view of the geometric textile material of FIG. 17.

Referring to FIGS. 16-17A, as an example, the drainage layer 42 can comprise or consist of a form of the geometric textile (geotextile) material 52 disclosed in U.S. Pat. Nos.

4,022,596 and 4,929,398 granted to George C. Pedersen (the "Pedersen patents"), the disclosures of which are hereby incorporated by reference in their entireties. Such geotextile material is a highly ordered geometric engineered textile (or knitted geometric mesh structure material).

The Pedersen patents disclose a particular geotextile material and certain uses of such material. However, the Pedersen patents do not disclose or suggest the structure of the fiber bed assembly 10 disclosed herein including the configuration of the geotextile material as a drainage layer within a fiber bed media in such a fiber bed assembly, or the particular configuration of the geotextile material for such use. The present inventors have discovered a new and significant performance-increasing use and modification of such geotextile material as disclosed herein.

The geotextile material 52 is described herein as if in a planar form. However, as described herein the material 52 is particularly adapted to bend, for example into a tubular form to form or comprise the drainage layer 42.

Pursuant to the disclosures of the Pedersen patents, the geotextile material 52 is made up of a first set of strands 54 extending in parallel fashion in one predetermined direction and being substantially straight throughout their length (when the material is in planar form). The strands 54 of the first set are arranged in a repeating pattern, preferably of a saw-tooth cross-sectional configuration (for example where the cross-sections form a two-dimensional substantial triangular wave pattern), such that the thickness of the fabric is essentially defined by a perpendicular distance (e.g., perpendicular to the "plane" of the material) between strands at the extremes of such pattern, for example a horizontal distance between the leftmost strand 54a and the rightmost strand 54b. This thickness dimension can be a substantial multiple—depending upon the number of strands in each of the "repeats", but typically greater than ten—of the diameter of the individual strands 54 of the first set.

A second set of strands 56 extends at right angles to the first set and is similarly arranged to have a generally sawtooth cross-sectional configuration. Where the strands of the second set 56 intersect with the strands of the first set 54, the strand of the second set 56 passes between two of the strands 54 of the first set and then is redirected at a sharp angle (e.g., 90 or 180 degrees) to pass around the next adjacent strand 54 of the first set. The strand of the second set 56 is then redirected parallel to its original direction, which is parallel to the "plane" of the fabric structure generally, until the strand of the second set 56 again intersects with and passes between two of the strands of the first set 54. Upon passing between such two strands 54, the strand of the second set 56 is redirected to pass around the next adjacent strand 54, after which the strand 56 is again directed in its original plane until it intersects with a subsequent group of strands 54 from the first set.

In the idealized construction shown in FIGS. 17 and 17A, the strands 54 of the first set are substantially straight throughout their length. The strands 56 of the second set, extending at right angles thereto, are arranged in substantially straight segments, which are alternately offset. Thus, with reference to FIG. 17A, a particular strand 56a of the second set 56 typically will have a first section 58, extending straight in the "plane" of the fabric structure. The first section 58 joins with a section 59 which, in the illustrated construction, is offset three strand thicknesses leftward, but extends parallel to it. The section 59 is in turn connected to a section 60, which is generally coaxial with the section 58. A further section 61 is substantially coaxial with the section 59 and this pattern repeats throughout the length of the strand.

The geotextile material illustrated can be constructed utilizing thermoplastic monofilament strands, with the relatively straight first set of strands 54 comprising weft strands, and the strands of the second set 56 comprising the warp. After the initial construction, a treatment procedure can be carried out (such as heat treatment), during which the weft strands 56 are held under sufficient tension to maintain their relative straightness.

Although the geotextile material illustrated has a waffle-like structure, with deep void-forming pockets 62, the fabric is substantially non-nestable with layers of like material, because the strands 54, 56 extend substantially straight through the fabric. If adjacent layers of the material come into contact, the strands 54 at the surface of one layer of material will contact strands 56 of an adjacent contacting layer, running at 90 degrees thereto. This effectively prevents nesting regardless of how one layer of material registers with respect to an adjacent layer.

As an alternate description, the geotextile material can include a first set of strands of material, where each strand of the first set is substantially straight and parallel to every other strand in the set, and ach strand of the first set being spaced from every other strand in the set both vertically and horizontally. A second set of strands of material is interleaved with the first set, and each of the strands of the second set is substantially parallel to every other strand in the set. The strands of the first set are perpendicular to the strands of the second set. The lengths of each strand of the second set extend in interleaved fashion through the strands of the first set in a geometric orientation to fit vertical and horizontal offset spacing of each strand in the first set. Each of the strands of the second set include a plurality of substantially straight-line portions connected at angles to provide the geometric orientation. The geometric orientation of the second set of strands and the offset spacing of the first set of strands gives the geometric mesh structure a thickness in cross section substantially greater than a diameter of the strands of the first and second sets of strands.

Figure 18:
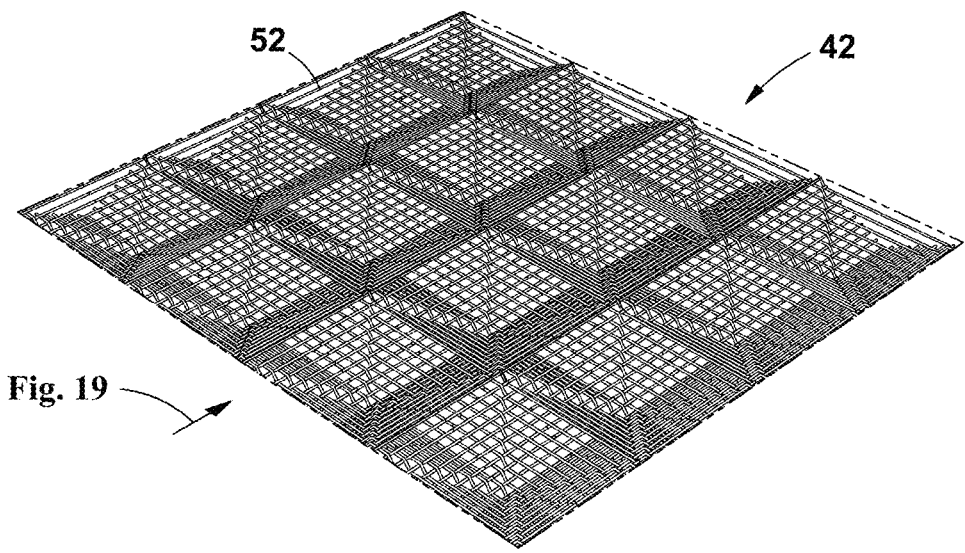
FIG. 18 is a perspective view of a second geometric textile material
Figure 19:
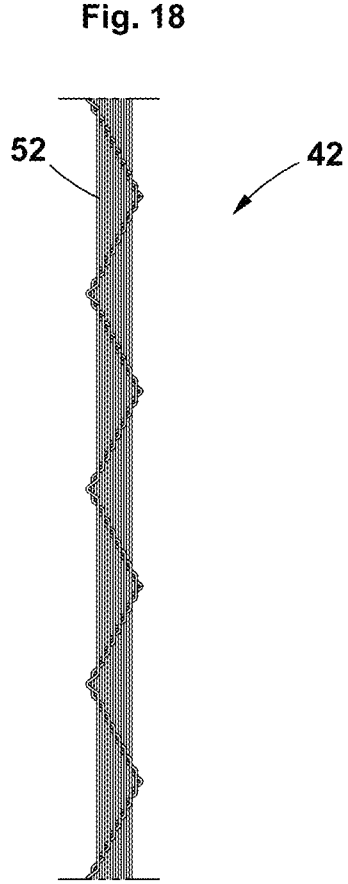
FIG. 19 is a cross-section view of the geometric textile material of FIG. 18.

Referring to FIGS. 18 and 19, the drainage layer 42 can comprise or consist of the geotextile material as disclosed in the Pedersen patents but as modified and adapted for use in the present invention. The modified geotextile material can be constructed to be relatively thin, for example with a thickness of about 1/16 inches to about 1 inch, and preferably about 1/8 in (0.125 inches). The modified material preferably has a relatively short pattern repeat distance of less than 1 inch, such as about 1/3 or 1/4 inches. The strands of the material can have diameters of 0.002-0.037 inches (i.e., 2-37 mils) and preferably 0.008-0.016 inches (8-16 mils). The modified material also has increased compressive resistance sufficient to resist substantial deformation during normal operation in the fiber bed media 26, especially when located in the upstream-biased location as discussed herein. The modified material also has low liquid flow resistance, hydrophobic properties, a low density, non-nesting, and substantial compression resistance.

As discussed herein, the geotextile material can comprise repeating geometric shapes, such as squares. When the fiber bed assembly 10 is constructed, the geotextile material can be aligned in a square pattern wherein the repeats of the material are substantially aligned with the longitudinal axis 11 of the fiber bed assembly 10. In this configuration one of the first and second set of strands 54, 56 of the material are aligned generally parallel the longitudinal axis 11 of the fiber bed assembly 10 (i.e., typically aligned vertically) and the other one of the first and second sets of strands are aligned generally perpendicular to the longitudinal axis (i.e., typically substantially horizontal) such that the repeats of the geotextile material are arranged with sides aligned vertically and horizontally, when in use.

Alternatively, when the fiber bed assembly 10 is constructed, the geotextile material can be aligned in a diamond pattern wherein the repeats of the material are substantially angularly off-set from vertical. In this configuration, neither the first nor the second sets of strands 54, 56 are aligned generally parallel or perpendicular to the longitudinal axis 11 of the fiber bed assembly 10. Instead, the first and second strand 54, 56 are aligned at an acute angle relative to the longitudinal axis 11 of the fiber bed assembly 10 which can decrease lateral flow resistance (and thereby increase lateral flow rate) through the material. For example, the geotextile material can be off-set from the longitudinal axis 11 by about 5-85 degrees, or more preferably about 45 degrees. One method to assemble this construction is by wrapping the geotextile material in a spiral or helical path at, for example, 45 degrees relative to the longitudinal axis 11, although other methods are available.

Referring to FIGS. 8 through 14, a second embodiment of the invention of a fiber bed assembly 110 can be configured as a hanging candle for processing a gas flow in an outside-in direction. As can be appreciated, much of the description of the first embodiment applies to the second embodiment. Therefore, for brevity, the second embodiment may be considered to share the features described above with respect to the first embodiment, and other or different features as described further below.

The fiber bed assembly 110 of the second embodiment is configured to be removably mounted within a mist eliminator vessel 112, which is configured for vertical orientation and outside-in process gas flow through the fiber bed assembly.

The mist eliminator vessel 112 preferably includes a bottom portion 113 with an inlet pipe 114 and a lower collection chamber 118 with a drain pipe 120. The vessel 112 also preferably includes a top portion 115 with an outlet pipe 116.

The fiber bed assembly 110 can be generally cylindrical in shape having a central longitudinal axis 111 (although other shapes are possible) and has a fiber bed support 117 which can include a structural inner cage 122 and an outer cage 124. These cages support a fiber bed media 126 disposed therebetween. The inner and outer cages 122, 124 can be any suitable support, such as described above.

At the top of the fiber bed assembly 110 is a top flange 128 which is preferably annular in shape. The top flange 128 includes a central through-hole 134, through which process gas enters the fiber bed assembly 110. The top plate 128 can be equipped with lifting lugs 130 for safe installation and removal of the fiber bed assembly 110. The top flange 128 can also include a plurality of circumferentially spaced through-holes 136 for receiving mounting fasteners, enabling secure installation of the fiber bed assembly 110 within the vessel 112. However, the fiber bed assembly 110 may be mounted to the vessel 112 using any appropriate method, such as described herein.

The bottom of the fiber bed assembly 110 preferably includes a bottom plate 132 which spans the outer circumference of the outer cage 124.

Figure 12:
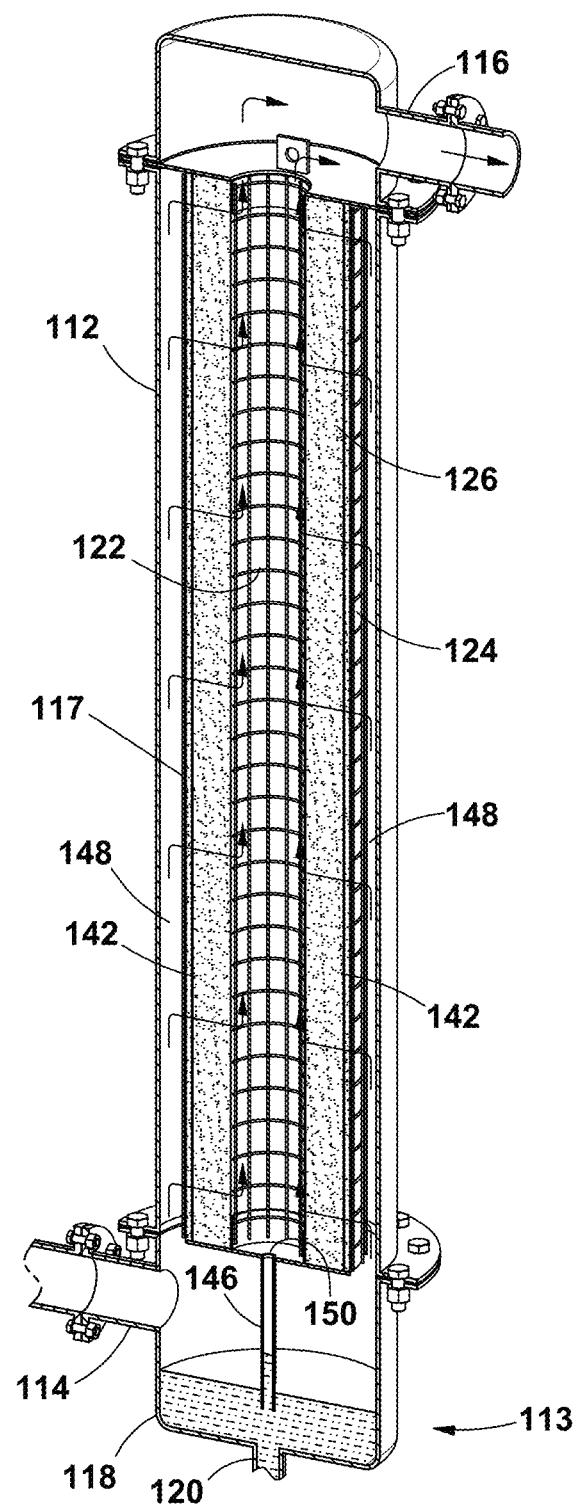
FIG. 12 is a perspective cross-section view of the fiber bed assembly of FIG. 8 installed in a fiber bed mist eliminator, showing the cutting plane.
Figure 13:
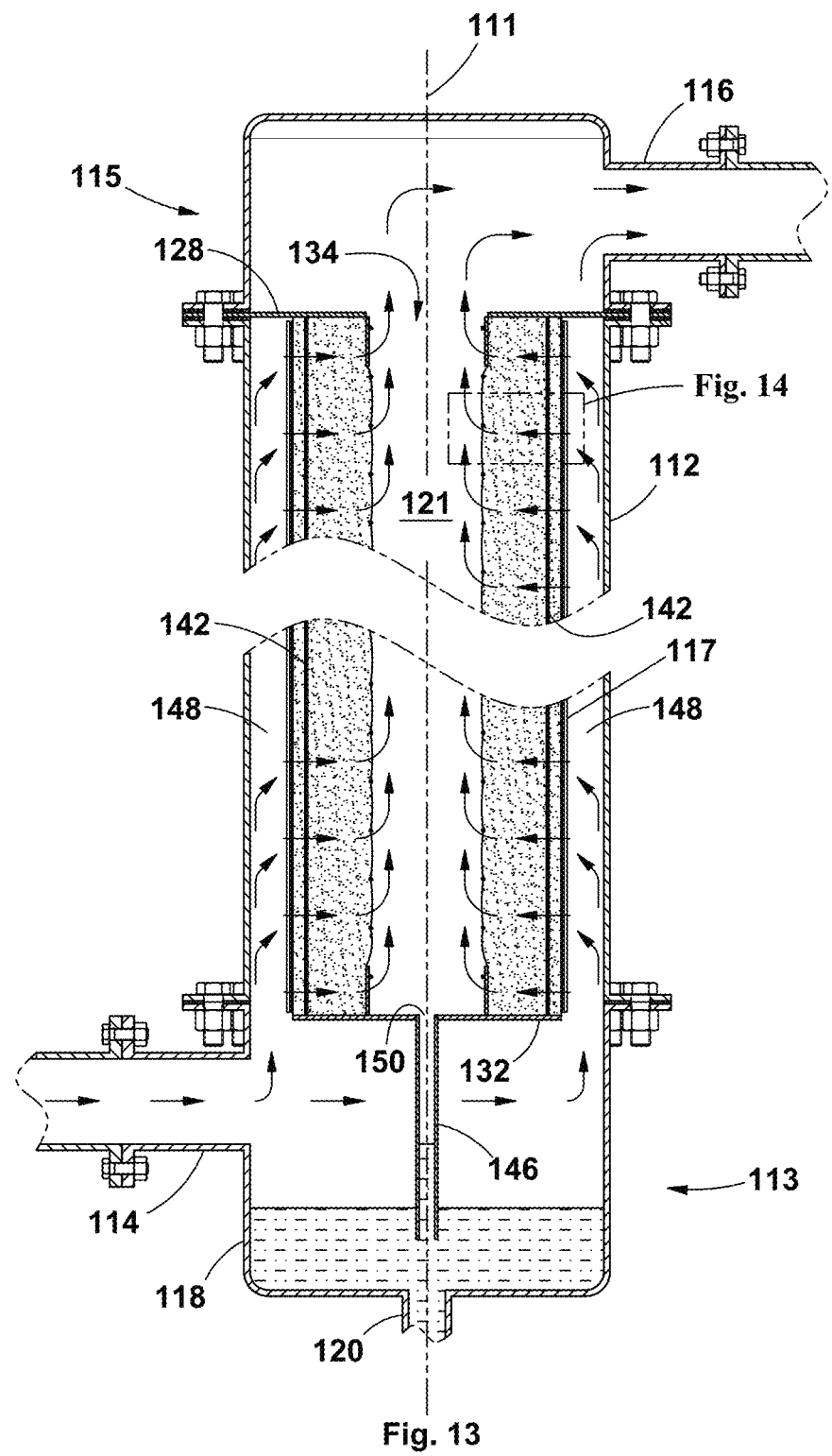
FIG. 13 is an elevation cross-section view of the fiber bed assembly of FIG. 8 installed in a fiber bed mist eliminator.

Referring to FIGS. 12 and 13, in this embodiment, the fiber bed assembly 110 can be configured as a "hanging candle" operable for outside-in flow. During operation, process gas enters the interior of the vessel 112 through the inlet pipe 114, flows upwardly into an upstream area 148 of the vessel 112 which is disposed radially outward from the fiber bed assembly 110, then flows radially inwardly through the fiber bed media 126. The process gas then enters a (typically cylindrical) interior 121 (i.e., void) of the fiber bed assembly 110 defined by the inner cage 122, flows upward through the interior 121, and passes through the central through-hole 134 of the top flange 128 of the fiber bed assembly 110.

After passing through the fiber bed media 126, cleaned gas travels upward and exits the vessel 112 through the outlet pipe 116 at the top. Thus, in this example the direction of gas flow through the fiber bed media 126 is generally horizontally radially inward, from the upstream area 148 of the vessel 112 to the interior 121 of the fiber bed assembly 110.

Entrained materials captured by the fiber bed 126 (i.e., captured material) coalesces and drains downward through the fiber bed 126 and into the collection chamber 118, where it exits through the drain pipe 120. The fiber bed assembly 110 (and/or the vessel 112) can include a drain tube 146 projecting from the bottom plate 132 into the lower collection chamber 118. The drain tube 146 is preferably in fluid communication the interior 121 of the fiber bed assembly 110, for example via a fluid passage 150 in the bottom plate 132.

Figure 14:
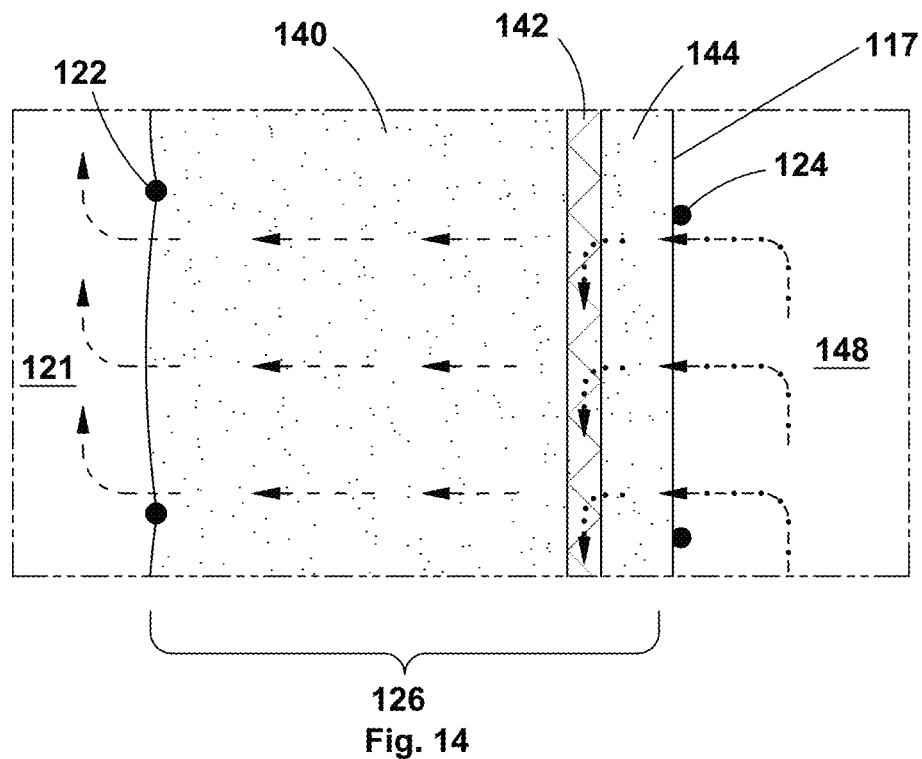
FIG. 14 is a close-up view of the fiber bed assembly of FIG. 8, labeled FIG. 14 in FIG. 13.

As best seen in the detailed cross-sectional view of FIG. 14, the fiber bed media 126 preferably comprises a set of three layers including first and second collection layers 140, 144 and an intermediate drainage layer 142 disposed between the first and second collection layers. The set of three layers is disposed between the fiber bed support 117, for example spanning between the inner and outer cages 122, 124.

The first and second collection layers 140, 144 are preferably configured and optimized for collection of an entrained liquid phase in the gas stream (including but not limited to aerosols) and can be composed of the same type of fiber media, although different materials may be used depending on the application.

The first and second collection layers 140, 144 can be composed of various types of materials, including fibrous materials configured and operable for collection of entrained materials in the gas stream, such as the materials described above with respect to such layers.

As described above, the first collection layer 140 can be considered an initial coalescing layer and the second collection layer 144 can be considered a performance coalescing layer.

The drainage layer 142, located between the first and second collection layers, is preferably configured and optimized for drainage of the liquid phase captured (e.g., coalesced) by the first collection layer 140, and can consist of or comprise the materials described above with respect to such layer, including a highly ordered geometric engineered textile or knitted geometric mesh structure material such as the geotextile material disclosed in the Pedersen patents, and as described further above.

The first collection layer 140 is preferably disposed upstream of the drainage layer 142 in a flow direction of the process gas through the fiber media, i.e., radially outwardly of the drainage layer 142 in this embodiment. The drainage layer 142 preferably abuts and is positioned downstream of the first collection layer 140 in the flow direction of the process gas through the fiber media 126. The second collection layer 144 preferably abuts and is positioned downstream of the drainage layer 142 in the flow direction of the process gas through the fiber media.

The fiber bed media 126 has a generally cylindrical inner surface and a generally cylindrical outer surface. In this embodiment (configured for outside-in flow), the outer surface is upstream, and the inner surface is downstream.

The first collection layer 140 is preferably disposed on and/or substantially forms the outer (upstream) surface of the fiber bed media 126 and the second collection layer 144 is preferably disposed on and/or substantially forms the inner (downstream) surface. However, other configurations are within the scope of the invention, as described above.

Referring to the close-up view of FIG. 14 (which is not necessarily to scale), the drainage layer 142 is preferably biased toward the upstream surface of the fiber bed media 126. However, the drainage layer 142 can be disposed at different depths within the fiber bed media 126 to adjust for various applications and/or liquid loading in the gas flow.

Preferably, the first collection layer 140 is relatively thin and the second collection layer 144 is relatively thick such that the drainage layer 142 is disposed relatively close to the upstream surface of the fiber bed media 126 so that the drainage layer 142 is in an upstream-biased position and therefore is operable to drain captured material (e.g., coalesced liquid) out of the fiber bed media 126 at a relatively early point in the flow of process gas through the fiber bed media 126.

The first and second collection layers 140, 144 and the drainage layer 142 can have thicknesses as measured along the flow direction of the process gas from the upstream surface to the downstream surface of the of the fiber bed media 126. The first collection layer 140 can have a thickness less than a thickness of the second collection layer 144, and the drainage layer 142 can have a thickness less than the thickness of the first collection layer 140. For example, as a percentage of the total thickness of the fiber bed media 126, the first collection layer 140, drainage layer 142 and second collection layer 144 can have thicknesses of about 5-50%, 0.5-20% and 30-94.5%, respectively, and preferably about 15%, 2% and 83%, respectively. However, other relative thicknesses are within the scope of the invention.

For example, the fiber bed media 26 can have an overall thickness, as measured along the flow direction of the process gas from the upstream surface to the downstream surface, of about 4-8 inches, and the drainage layer 142 can have a corresponding thickness of about 0.08-0.16 inches (e.g., about 2% total thickness).

As described above, the first and second collection layers 140, 144 and the drainage layer 42 preferably extend substantially continuously along a height of the fiber bed assembly 10, from the top plate 28 to the bottom flange 32, and/or substantially continuously around the circumference of the fiber bed assembly 10. However, other configurations are within the scope of the invention, including as described above.

To construct the fiber bed assembly 110, the fiber bed media 126 is preferably wrapped around the inner cage 122. For example, if the layers are independent, they can be wrapped around the inner cage 122 in sequential steps, with the innermost layer of the set (e.g., the second collection layer 142) being the first of the three layers to be wrapped, followed by the intermediate layer (e.g., the drainage layer 142), and then the outermost layer of the set (e.g., the first collection layer 144). On the other hand, if some or all the three layers are joined prior to installation (e.g., laminated), the laminate can be wrapped around the inner cage 122 in one step. The layers of the set of three layers (or any laminated layers) are preferably wrapped around the inner cage 122 in a circular manner. However, such layers can optionally be wrapped in other manners, such as a spiral or helical wrap.

Figure 15:
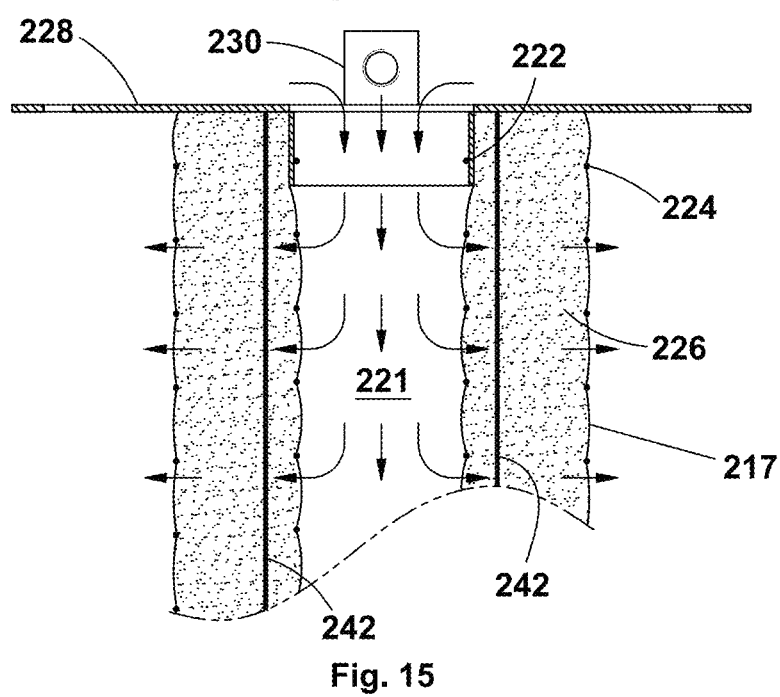
FIG. 15 is a partial elevation cross-section view of a third embodiment of a fiber bed assembly constructed in accordance with the invention.

Referring to FIG. 15, a third embodiment of the invention of a fiber bed assembly 210 can be configured as a reverse-flow hanging candle for processing a gas flow in an inside-out direction. As can be appreciated, much of the descriptions of the first and second embodiments apply to the third embodiment. Therefore, for brevity, the third embodiment may be considered to share the features described above with respect to the first and second embodiments, and other or different features as described further below.

In this embodiment, the vessel is not depicted. However, reference is made below to the vessel 112 described and depicted with respect to the second embodiment (e.g., FIGS. 12 and 13) which is suitable for this embodiment. One distinction is that that, due to the reverse flow of the process gas through the vessel, the outlet of the vessel 112 (pipe 116) is referred to below as an inlet, and the inlet (pipe 114) is referred to as the outlet.

The fiber bed assembly 210 of the third embodiment is configured to be removably mounted within a mist eliminator vessel which is configured for vertical orientation and inside-out process gas flow through the fiber bed assembly 210.

The fiber bed assembly 210 can be generally cylindrical in shape (although other shapes are possible) and has a fiber bed support 217 which can include a structural inner cage 222 and an outer cage 224. These cages support a fiber bed media 226 disposed therebetween. The inner and outer cages 222, 224 can be any suitable support, such as described above.

At the top of the fiber bed assembly 110 is a top flange 228 which is preferably annular in shape. The top flange 228 includes a central through-hole 234, through which process gas enters the fiber bed assembly 210. The top plate 228 can be equipped with lifting lugs 230 for safe installation and removal of the fiber bed assembly 210. The fiber bed assembly 210 may be mounted to a vessel using any appropriate method, such as described above.

The bottom of the fiber bed assembly 210 preferably includes a bottom plate 232 which spans the outer circumference of the outer cage 224.

The fiber bed assembly 210 can be configured as a reverse-flow "hanging candle" operable for inside-out flow. During operation, process gas enters the vessel via an inlet pipe (such as pipe 116 of vessel 112 of FIGS. 12 and 13), passes through the central through-hole 234 of the top flange 228 of the fiber bed assembly 210 and then enters a (typically cylindrical) interior 221 (i.e., void) of the fiber bed assembly 210 defined by the inner cage 222.

Thereafter, the process gas flows radially outwardly through the fiber bed media 226 to a downstream area of the vessel and thereafter exits the vessel (such as via pipe 14 of vessel 112).

Thus, in this example the direction of gas flow through the fiber bed media 226 is generally horizontally radially outward, such as described with respect to the first embodiment. Therefore, the construction of the fiber bed media 226 can be as described with respect to the first embodiment, which is also configured for inside-out gas flow.

The fiber bed media 226 preferably comprises a set of three layers including first and second collection layers 240, 244 and an intermediate drainage layer 242 disposed between the first and second collection layers. The set of three layers is disposed between the fiber bed support 217, for example spanning between the inner and outer cages 222, 224.

The first and second collection layers 240, 244 are preferably configured and optimized for collection of an entrained liquid phase in the gas stream and can be composed of various types of materials, including fibrous materials configured and operable for collection of entrained materials in the gas stream, such as the materials described above with respect to such layers.

As described above, the first collection layer 240 can be considered an initial coalescing layer and the second collection layer 244 can be considered a performance coalescing layer.

The drainage layer 242, located between the first and second collection layers, is preferably configured and optimized for drainage of the liquid phase captured and can consist of or comprise the materials described above with respect to such layer, including a highly ordered geometric engineered textile or knitted geometric mesh structure material such as the geotextile material disclosed in the Pedersen patents, and as described further above.

The first collection layer 240 is preferably disposed upstream of the drainage layer 242 in a flow direction of the process gas through the fiber media, i.e., radially inwardly of the drainage layer 242 in this embodiment. The drainage layer 242 preferably abuts and is positioned downstream of the first collection layer 240 in the flow direction of the process gas through the fiber media. The second collection layer 244 preferably abuts and is positioned downstream of the drainage layer 242 in the flow direction of the process gas through the fiber bed media 226.

The fiber bed media 226 has a generally cylindrical inner surface and a generally cylindrical outer surface. In this embodiment (configured for inside-out flow), the inners surface is upstream, and the outer surface is downstream.

The first collection layer 240 is preferably disposed on the inner (upstream) side of the fiber bed media 226 and the second collection layer 244 is preferably disposed on the outer (downstream) side. However, other configurations are within the scope of the invention, as described above.

While the above embodiments depict cylindrical fiber bed assemblies with generally tubular fiber bed media, the invention is also applicable to fiber bed assemblies and fiber bed media of other shapes. For example, the fiber bed media can have a substantially planar shape (e.g., flat) or an undulating shape, such as a corrugated or pleated shape, or another suitable shape. In addition, an undulating fiber bed media (e.g., pleated or corrugated shape) can be formed into an undulating tubular shape for use in a cylindrical fiber bed assembly, as described above, or elsewhere.

A planar or undulating fiber bed media can have, as described above (e.g., FIG. 7), a set of three layers including first and second collection layers and an intermediate drainage layer disposed between the first and second collection layers. The set of three layers can be disposed between a fiber bed support, for example spanning between inner and outer cages of a fiber bed support.

The fiber bed assembly could be in the form of a cartridge for example having a peripheral support frame which supports the fiber bed media, where a shape of peripheral support frame could be square, rectangular, circular, triangular or another suitable shape.

The first and second collection layers can be configured and optimized for collection of an entrained liquid phase in the gas stream and can be composed of various types of materials, including fibrous materials configured and operable for collection of entrained materials in the gas stream, such as the materials described above with respect to such layers.

The drainage layer, located between the first and second collection layers, can be configured and optimized for drainage of the liquid phase captured and can consist of or comprise the materials described above with respect to such layer, including a substantially uniform, highly ordered geometric engineered textile or knitted geometric mesh structure material such as the geotextile material disclosed in the Pedersen patents, and as described further above.

The first collection layer can be disposed upstream of the drainage layer in a flow direction of the process gas through the fiber media. The drainage layer can abut and be positioned downstream of the first collection layer in the flow direction of the process gas through the fiber media. The second collection layer can abut and be positioned downstream of the drainage layer in the flow direction of the process gas through the fiber media.

The first collection layer can be disposed on an upstream side of the fiber bed media and the second collection layer can be disposed on a downstream side of the fiber bed media. However, other configurations are within the scope of the invention, as described above.

The planar fiber bed assembly can be installed within a vessel configured to receive a planar fiber bed and operable to process a moving gas stream to collect and remove entrained material including a liquid phase, as described above.

Although the invention has been described with reference to a particular arrangement of parts, features and the like, these are not intended to exhaust all possible arrangements or features, and indeed many other modifications and variations will be ascertainable to those of skill in the art.

What is claimed:

1. A fiber bed assembly for a fiber bed mist eliminator operable to remove entrained liquid phase material from a moving gas stream, the fiber bed assembly comprising:
    a fiber bed support;
    a fiber bed supported by the fiber bed support;
    the fiber bed having an upstream surface and a downstream surface and being operable to receive the moving gas stream having a gas flow direction transverse to the fiber bed, from the upstream surface to the downstream surface;
    the fiber bed comprising first and second collection layers, and an intermediate drainage layer disposed between the first and second collection layers;
    each of the first and second collection layers comprising a dense collection media having randomly positioned fibers forming a tortuous gas flow path and being operable to capture entrained liquid phase material, as first and second collected material, respectively, by one or more methods of impaction, interception, and Brownian diffusion;
    the drainage layer abutting a downstream surface of the first collection layer and abutting an upstream surface of the second collection layer;
    the drainage layer comprising a drainage media composed of a highly ordered geometric mesh structure; and
    the drainage layer forming a lateral drainage channel immediately downstream of the first collection layer and generally perpendicular to the gas flow direction, and the drainage layer being operable to drain the first collected material collected by the first collection layer, in a lateral flow direction through the drainage layer; and the drainage layer being disposed closer to the upstream surface than the downstream surface.

2. A fiber bed assembly, as in claim 1, wherein:
the drainage media has low flow resistance in lateral and transverse directions relative to the collection media; and
the drainage media has substantial compression resistance sufficient to withstand distributed compression forces encountered during use, without substantial deformation.

3. The fiber bed assembly as in claim 1, further comprising:
the first collection layer being disposed along the upstream surface of the fiber bed.

4. The fiber bed assembly as in claim 3, wherein:
the second collection layer is disposed along the downstream surface of the fiber bed.

5. The fiber bed assembly as in claim 1, wherein:
the fiber bed assembly has a top and a bottom;
the first and second collection layers and the drainage layer extend substantially continuously from the top of the fiber bed to the bottom.

6. The fiber bed assembly as in claim 1, wherein:
the fiber bed has a thickness from the upstream surface to the downstream surface in the gas flow direction;
the first collection layer has a thickness less than about 25% of the thickness of the fiber bed; and
the drainage layer has a thickness less than the thickness of the first collection layer.

7. The fiber bed assembly as in claim 6, wherein:
the thickness of the first collection layer is less than about 20% of the thickness of the fiber bed; and
the thickness of the drainage layer is less than about 5% of the thickness of the fiber bed.

8. A fiber bed assembly as in claim 1, wherein:
the fiber bed support and fiber bed are generally cylindrical in shape;
the fiber bed has a generally cylindrical inner surface and a generally cylindrical outer surface, and the fiber bed assembly has a generally cylindrical void interior space defined by the inner surface of the fiber bed;
the drainage layer is substantially tubular in shape;
the fiber bed assembly is configured for inside-out flow; and
the upstream surface of the fiber bed is disposed on the interior surface of the fiber bed and the downstream surface of the fiber bed is disposed on the exterior surface of the fiber bed.

9. A fiber bed assembly as in claim 1, wherein:
the fiber bed support and fiber bed are generally cylindrical in shape;
the fiber bed has a generally cylindrical inner surface and a generally cylindrical outer surface, and the fiber bed assembly has a generally cylindrical void interior space defined by the fiber bed;
the drainage layer is substantially tubular in shape;
the fiber bed assembly is configured for outside-in flow; and
the upstream surface of the fiber bed is disposed on the exterior surface of the fiber bed and the downstream surface of the fiber bed is disposed on the interior surface of the fiber bed.

10. The fiber bed assembly as in claim 1, wherein:
the geometric mesh structure of the drainage media comprises woven material of a waffle-weave construction comprising repeating groups of first and second sets of strands;
the first set of strands comprises generally parallel strands which, in a planar configuration of the woven material, extend in substantially straight fashion in one predetermined direction;
each repeating group of strands of said first set being arranged in a generally saw-tooth cross sectional configuration whereby a thickness of the woven material is substantially equal to a height of said saw-tooth cross sectional configuration;
each repeating group of strands of said second set being arranged in a generally saw-tooth cross sectional configuration intersecting at right angles with the strands of said first set.

11. The fiber bed assembly of claim 10, wherein:
the drainage media comprises a plurality of individual layers of the woven material arranged in an abutting face-to-face relationship; and
in each of the plurality of layers of the woven material, intersecting strands of saw-tooth configuration form a substantially non-nestable waffle-weave construction, whereby the plurality of individual layers of the woven material may be assembled in face-to-face contact without reduction in a combined void fraction of the plurality of layers in relation to the individual layers.

12. The fiber bed assembly of claim 11, wherein:
the drainage layer consists of two individual layers of the woven material.

13. The fiber bed assembly as in claim 1, wherein:
the geometric mesh structure of the drainage media comprises woven material having a first set of generally parallel strands extending in substantially straight fashion in one predetermined direction and a second set of strands extending at right angles to the predetermined direction;
the strands of said first set being arranged in a repeating two-dimensional cross sectional geometric pattern in which strands at the extremes of the pattern define a fabric thickness which is a multiple of at least about 10 of a diameter of a strand;
the strands of the second set also being arranged in a repeating two-dimensional cross sectional geometric pattern intersecting with the strands of the first set;
the strands of the second set, at the extremes of the geometric pattern thereof, additionally defining a fabric thickness which is a multiple of at least about 10 of a diameter of a strand;
the strands of the second set extending in substantially straight manner in regions between contact with strands of the first set; and
the intersecting strands of the first and second sets forming a substantially non-nestable construction.

14. The fiber bed assembly as in claim 1, wherein the geometric mesh structure of the drainage media comprises:
a first set of strands of material, each strand of the first set being substantially straight and parallel to every other strand in the set;
each strand of the first set being spaced from every other strand in the set both vertically and horizontally;
a second set of strands of material interleaved with the first set, each of the strands of the second set being substantially parallel to every other strand in the set;
the strands of the first set being perpendicular to the strands of the second set;
the lengths of each strand of the second set extending in interleaved fashion through the strands of the first set in a geometric orientation to fit vertical and horizontal offset spacing of each strand in the first set;

each of the strands of the second set including a plurality of substantially straight-line portions connected at angles to provide the geometric orientation; and the geometric orientation of the second set and the offset spacing of the first set giving the geometric mesh structure a thickness in cross section substantially greater than a diameter of the strands of the first and second sets of strands.

15. A fiber bed assembly as set forth in claim 1, wherein: the fiber bed is generally tubular.

16. A fiber bed assembly as set forth in claim 1, wherein: a shape of the fiber bed is generally one of planar or undulating.

17. A mist eliminator system operable to remove an entrained liquid phase material from a moving gas stream, comprising:
    a vessel operable to receive a gas stream having an entrained liquid phase through an inlet and operable to output processed gas through an outlet; and
    a fiber bed assembly according to claim 1 disposed within the vessel and operable to collect the liquid phase of the gas stream; and
    the mist eliminator system having a high collection efficiency of the liquid phase of at least 94%.

18. The mist eliminator system as in claim 1, wherein: at least one of the first and second collection layers comprises multiple sub-layers.

19. The mist eliminator system as in claim 1, wherein: at least one of the first and second collection layers comprises a mat fiber bed media.

20. The mist eliminator system as in claim 1, wherein: at least one of the first and second collection layers comprises a roving fiber bed media.

21. A fiber bed assembly, as in claim 1, wherein: the drainage layer has a void fraction of at least 92%.

22. A fiber bed assembly for a fiber bed mist eliminator operable to remove entrained liquid phase material from a moving gas stream, the fiber bed assembly comprising:
    a fiber bed support;
    a fiber bed supported by the fiber bed support;
    the fiber bed having an upstream surface and a downstream surface and being operable to receive the moving gas stream having a gas flow direction transverse to the fiber bed, from the upstream surface to the downstream surface;
    the fiber bed comprising first and second collection layers, and an intermediate drainage layer disposed between the first and second collection layers;
    each of the first and second collection layers comprising a collection media having randomly positioned fibers forming a tortuous gas flow path and being operable to capture entrained liquid phase material, as first and second collected material, respectively, by one or more methods of impaction, interception, and Brownian diffusion;
    the drainage layer abutting a downstream surface of the first collection layer and abutting an upstream surface of the second collection layer;
    the drainage layer comprising a drainage media composed of a geometric mesh structure;
    the drainage layer forming a lateral drainage channel immediately downstream of the first collection layer and generally perpendicular to the gas flow direction, and the drainage layer being operable to drain the first collected material collected by the first collection layer, in a lateral flow direction through the drainage layer;
    the fiber bed has a thickness from the upstream surface to the downstream surface in the gas flow direction;
    the first collection layer has a thickness less than about 25% of the thickness of the fiber bed; and
    the drainage layer has a thickness less than the thickness of the first collection layer.

23. The fiber bed assembly as in claim 22, wherein: the thickness of the first collection layer is less than about 20% of the thickness of the fiber bed; and
    the thickness of the drainage layer is less than about 5% of the thickness of the fiber bed.

24. The fiber bed assembly as in claim 22, further comprising:
    the first collection layer being disposed along the upstream surface of the fiber bed.

25. The fiber bed assembly as in claim 24, wherein: the second collection layer is disposed along the downstream surface of the fiber bed.

26. The fiber bed assembly as in claim 23, further comprising:
    the first collection layer being disposed along the upstream surface of the fiber bed.

27. The fiber bed assembly as in claim 26, wherein: the second collection layer is disposed along the downstream surface of the fiber bed.

28. A fiber bed assembly for a fiber bed mist eliminator operable to remove entrained liquid phase material from a moving gas stream, the fiber bed assembly comprising:
    a fiber bed support;
    a fiber bed supported by the fiber bed support;
    the fiber bed having an upstream surface and a downstream surface and being operable to receive the moving gas stream having a gas flow direction transverse to the fiber bed, from the upstream surface to the downstream surface;
    the fiber bed comprising first and second collection layers, and an intermediate drainage layer disposed between the first and second collection layers;
    each of the first and second collection layers comprising a collection media having randomly positioned fibers forming a tortuous gas flow path and being operable to capture entrained liquid phase material, as first and second collected material, respectively, by one or more methods of impaction, interception, and Brownian diffusion;
    the drainage layer abutting a downstream surface of the first collection layer and abutting an upstream surface of the second collection layer;
    the drainage layer comprising a drainage media composed of a geometric mesh structure;
    the drainage layer forming a lateral drainage channel immediately downstream of the first collection layer and generally perpendicular to the gas flow direction, and the drainage layer being operable to drain the first collected material collected by the first collection layer, in a lateral flow direction through the drainage layer;
    the geometric mesh structure of the drainage media comprises woven material of a waffle-weave construction comprising repeating groups of first and second sets of strands;
    the first set of strands comprises generally parallel strands which, in a planar configuration of the woven material, extend in substantially straight fashion in one predetermined direction;
    each repeating group of strands of said first set being arranged in a generally saw-tooth cross sectional configuration whereby a thickness of the woven material is substantially equal to a height of said saw-tooth cross sectional configuration;

each repeating group of strands of said second set being arranged in a generally saw-tooth cross sectional configuration intersecting at right angles with the strands of said first set.

29. The fiber bed assembly of claim 28, wherein:

the drainage media comprises a plurality of individual layers of the woven material arranged in an abutting face-to-face relationship; and in each of the plurality of layers of the woven material, intersecting strands of saw-tooth configuration form a substantially non-nestable waffle-weave construction, whereby the plurality of individual layers of the woven material may be assembled in face-to-face contact without reduction in a combined void fraction of the plurality of layers in relation to the individual layers.

30. The fiber bed assembly of claim 29, wherein:

the drainage layer consists of two individual layers of the woven material.

31. A fiber bed assembly for a fiber bed mist eliminator operable to remove entrained liquid phase material from a moving gas stream, the fiber bed assembly comprising:

a fiber bed support;

a fiber bed supported by the fiber bed support;

the fiber bed having an upstream surface and a downstream surface and being operable to receive the moving gas stream having a gas flow direction transverse to the fiber bed, from the upstream surface to the downstream surface;

the fiber bed comprising first and second collection layers, and an intermediate drainage layer disposed between the first and second collection layers;

each of the first and second collection layers comprising a collection media having randomly positioned fibers forming a tortuous gas flow path and being operable to capture entrained liquid phase material, as first and second collected material, respectively, by one or more methods of impaction, interception, and Brownian diffusion;

the drainage layer abutting a downstream surface of the first collection layer and abutting an upstream surface of the second collection layer;

the drainage layer comprising a drainage media composed of a geometric mesh structure;

the drainage layer forming a lateral drainage channel immediately downstream of the first collection layer and generally perpendicular to the gas flow direction, and the drainage layer being operable to drain the first collected material collected by the first collection layer, in a lateral flow direction through the drainage layer;

the geometric mesh structure of the drainage media comprises woven material having a first set of generally parallel strands extending in substantially straight fashion in one predetermined direction and a second set of strands extending at right angles to the predetermined direction;

the strands of said first set being arranged in a repeating two-dimensional cross sectional geometric pattern in which strands at the extremes of the pattern define a fabric thickness which is a multiple of at least about 10 of a diameter of a strand;

the strands of the second set also being arranged in a repeating two-dimensional cross sectional geometric pattern intersecting with the strands of the first set;

the strands of the second set, at the extremes of the geometric pattern thereof, additionally defining a fabric thickness which is a multiple of at least about 10 of a diameter of a strand;

the strands of the second set extending in substantially straight manner in regions between contact with strands of the first set; and the intersecting strands of the first and second sets forming a substantially non-nestable construction.

32. A fiber bed assembly for a fiber bed mist eliminator operable to remove entrained liquid phase material from a moving gas stream, the fiber bed assembly comprising:

a fiber bed support;

a fiber bed supported by the fiber bed support;

the fiber bed having an upstream surface and a downstream surface and being operable to receive the moving gas stream having a gas flow direction transverse to the fiber bed, from the upstream surface to the downstream surface;

the fiber bed comprising first and second collection layers, and an intermediate drainage layer disposed between the first and second collection layers;

each of the first and second collection layers comprising a collection media having randomly positioned fibers forming a tortuous gas flow path and being operable to capture entrained liquid phase material, as first and second collected material, respectively, by one or more methods of impaction, interception, and Brownian diffusion;

the drainage layer abutting a downstream surface of the first collection layer and abutting an upstream surface of the second collection layer;

the drainage layer comprising a drainage media composed of a geometric mesh structure;

the drainage layer forming a lateral drainage channel immediately downstream of the first collection layer and generally perpendicular to the gas flow direction, and the drainage layer being operable to drain the first collected material collected by the first collection layer, in a lateral flow direction through the drainage layer;

the geometric mesh structure of the drainage media comprising:

a first set of strands of material, each strand of the first set being substantially straight and parallel to every other strand in the set;

each strand of the first set being spaced from every other strand in the set both vertically and horizontally;

a second set of strands of material interleaved with the first set, each of the strands of the second set being substantially parallel to every other strand in the set;

the strands of the first set being perpendicular to the strands of the second set;

the lengths of each strand of the second set extending in interleaved fashion through the strands of the first set in a geometric orientation to fit vertical and horizontal offset spacing of each strand in the first set;

each of the strands of the second set including a plurality of substantially straight-line portions connected at angles to provide the geometric orientation; and the geometric orientation of the second set and the offset spacing of the first set giving the geometric mesh structure a thickness in cross section substantially greater than a diameter of the strands of the first and second sets of strands.

* * * * *